United States Patent
Zoller et al.

(10) Patent No.: US 11,951,552 B2
(45) Date of Patent: Apr. 9, 2024

(54) PROCESS-CONTROLLED ENERGY SUPPLY OF AN INDUCTION COIL FOR A HEATING OF HEAT-SHRINK CHUCKS

(71) Applicants: E. Zeller GmbH & Co. KG E. Zoller GmbH & Co. KG Einstell-und Messgeraete, Pleidelsheim (DE); Karl SCHUESSLER GmbH & Co. KG, Bodelshausen (DE)

(72) Inventors: Alexander Zoller, Pleidelsheim (DE); Christian Pfau, Ingersheim (DE); Klaus Schuessler, Bodelshausen (DE)

(73) Assignees: E. ZOLLER GMBH & CO. KG EINSTELL-UND MESSGERÄTE, Pleidelsheim (DE); KARL SCHUESSLER GMBH & CO. KG, Bodelshausen (DE)

( * ) Notice: Subject to any disclaimer, the term of this patent is extended or adjusted under 35 U.S.C. 154(b) by 487 days.

(21) Appl. No.: 17/173,854

(22) Filed: Feb. 11, 2021

(65) Prior Publication Data

US 2021/0252606 A1    Aug. 19, 2021

(30) Foreign Application Priority Data

Feb. 14, 2020    (DE) .................... 10 2020 103 871.2

(51) Int. Cl.
| | | |
|---|---|---|
| *B23B 31/117* | (2006.01) | |
| *H05B 6/06* | (2006.01) | |
| (Continued) | | |

(52) U.S. Cl.
CPC ............ *B23B 31/1179* (2013.01); *H05B 6/06* (2013.01); *H05B 6/14* (2013.01); *H05B 6/44* (2013.01); *B23B 2240/28* (2013.01)

(58) Field of Classification Search
CPC ............ B23B 2240/28; B23B 31/1179; B23P 11/027; H05B 6/06; H05B 6/14; H05B 6/44
See application file for complete search history.

(56) References Cited

U.S. PATENT DOCUMENTS

| | | | |
|---|---|---|---|
| 6,755,228 B2* | 6/2004 | Kelch | H05B 6/42 |
| | | | 156/499 |
| 2003/0209535 A1 | 11/2003 | Haimer et al. | |
| 2019/0014620 A1* | 1/2019 | Podhrázký | B23P 11/027 |

FOREIGN PATENT DOCUMENTS

| | | |
|---|---|---|
| CN | 108605385 A | 9/2018 |
| DE | 101 57 432 A1 | 6/2003 |
| (Continued) | | |

OTHER PUBLICATIONS

German Search Report dated Jan. 19, 2021 issued on corresponding DE application No. 10 2020 103 871.2 ( and English translation attached).

(Continued)

*Primary Examiner* — Dana Ross
*Assistant Examiner* — Joe E Mills, Jr.
(74) *Attorney, Agent, or Firm* — POSZ LAW GROUP, PLC

(57) ABSTRACT

An induction heating device for a shrink-clamping and/or unshrink-unclamping of tools into and/or out of tool holders has an induction heating unit with at least one first inductor and at least one second inductor, which is preferably realized separately from the first inductor, wherein the first inductor and the second inductor are configured to respectively expand at least a portion, in particular different portions, of the tool holder by inductive heating in a shrink-clamping and/or unshrink-unclamping process, and has an electric supply unit, (Continued)

Figure 1:
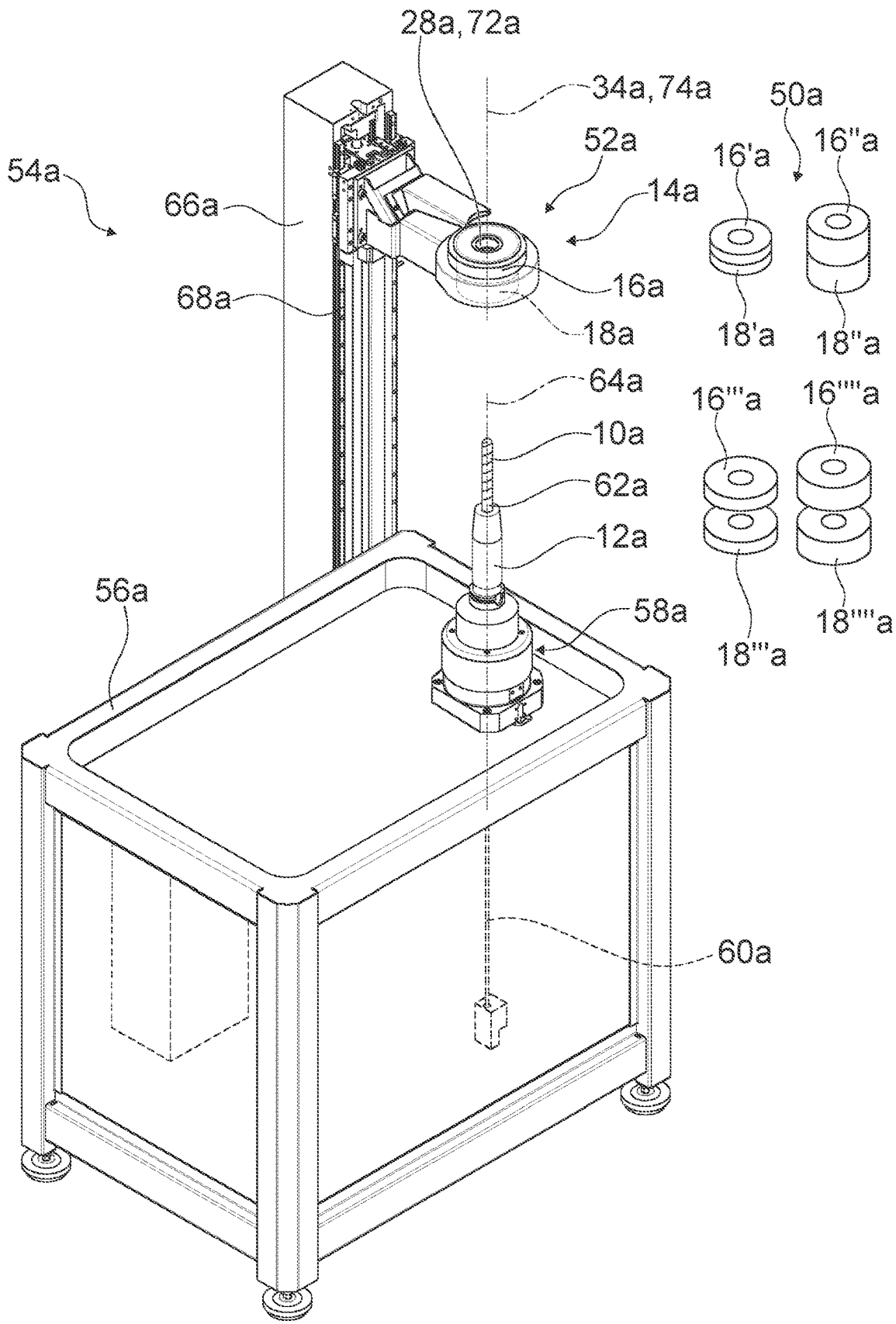

wherein the inductors are configured to output respectively different energies to different subregions of a tool holder, which are in a heating operating respectively encompassed by the inductors, as one of the inductors has more windings than the other inductor, in particular by at least 10%, preferably by at least 20% and preferentially by at least 30% more windings, and/or as the electric supply unit is at least configured to operate the first inductor and the second inductor in different manners.

30 Claims, 9 Drawing Sheets

(51) Int. Cl.
*H05B 6/14* (2006.01)
*H05B 6/44* (2006.01)

(56) References Cited

FOREIGN PATENT DOCUMENTS

| DE | 202005012366 U1 | 12/2005 |
| DE | 10 2005 004 166 A1 | 10/2006 |
| DE | 20 2005 012 523 U1 | 1/2007 |
| EP | 1 314 511 A2 | 5/2003 |
| EP | 1 750 485 A1 | 2/2007 |

OTHER PUBLICATIONS

Extended European Search Report dated Jun. 28, 2021 issued on corresponding EP application No. 21155530.5 ( and English translation).
Office Action dated Jul. 28, 2023 issued in corresponding Chinese Patent Application 202110190042.6 (and English machine translation).

* cited by examiner

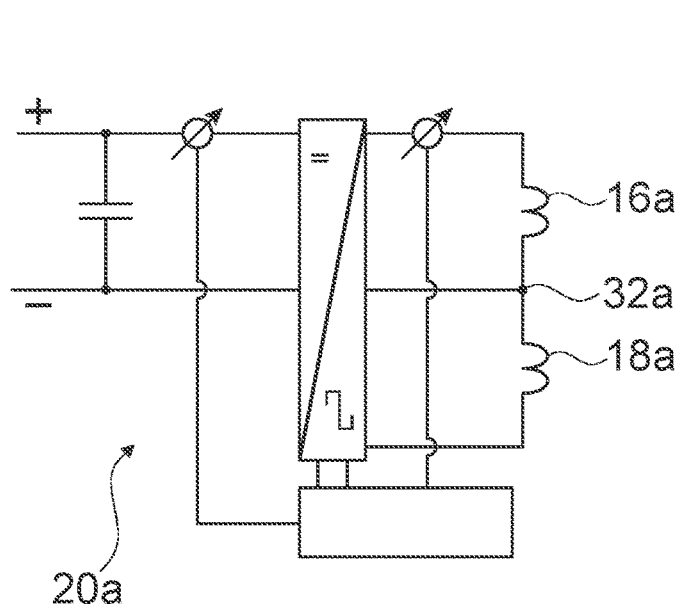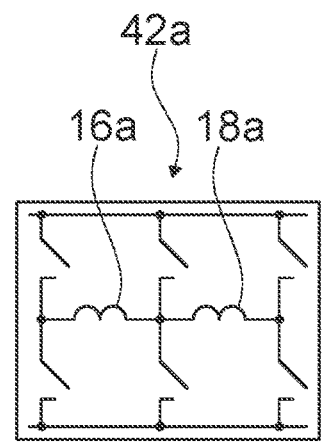
Fig. 3a  Fig. 3b
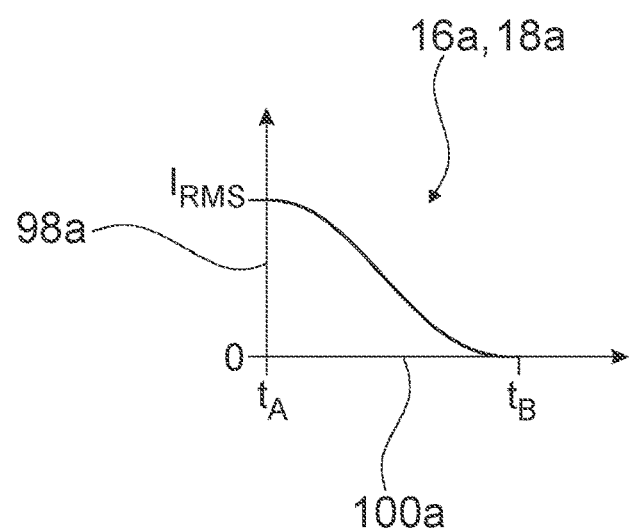
Fig. 3c

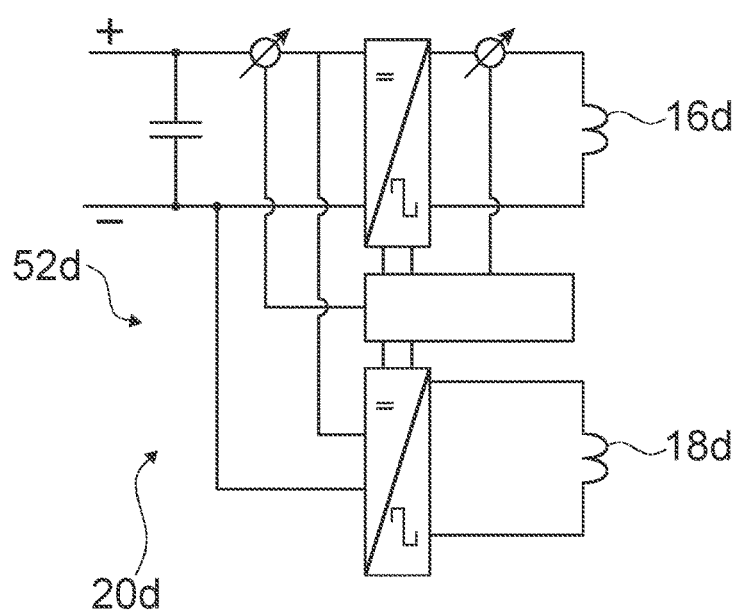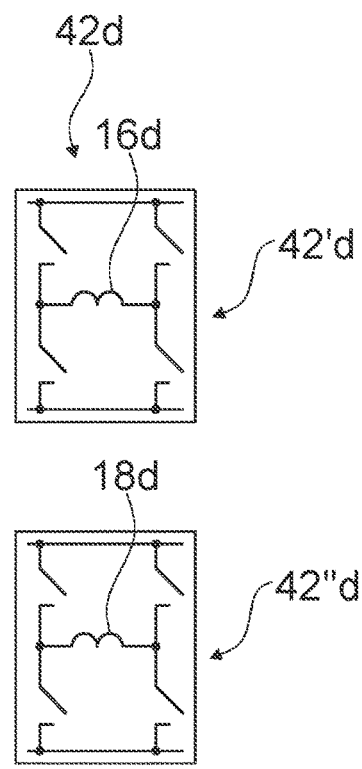
Fig. 8a                Fig. 8b
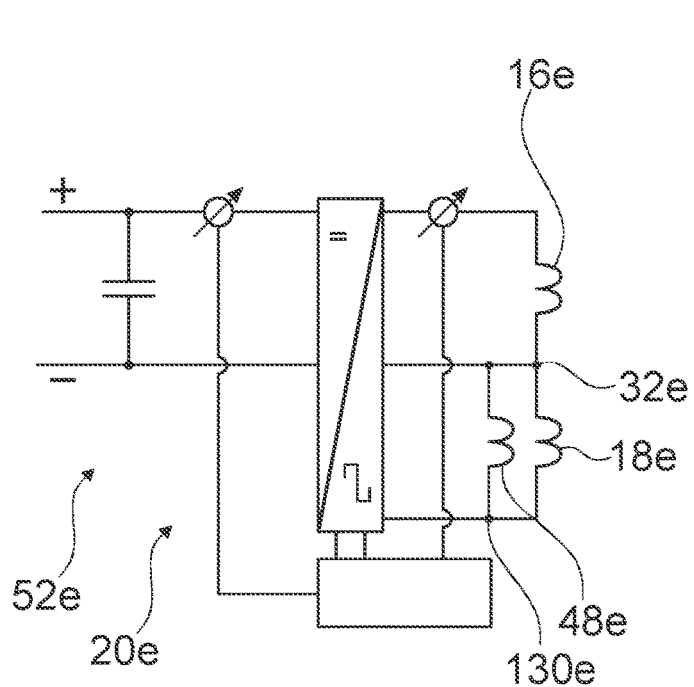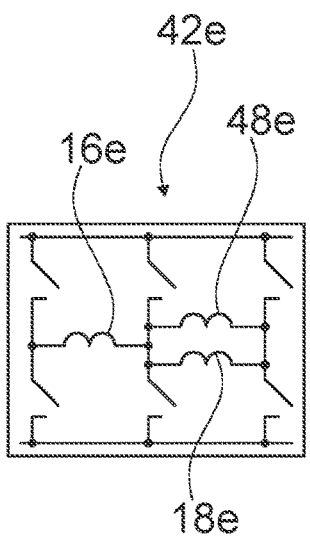
Fig. 9a                Fig. 9b

PROCESS-CONTROLLED ENERGY SUPPLY OF AN INDUCTION COIL FOR A HEATING OF HEAT-SHRINK CHUCKS

CROSS REFERENCE TO RELATED APPLICATION

This application is based on and incorporates herein by reference German Patent Application No. 10 2020 103 871.2 filed on Feb. 14, 2020.

PRIOR ART

The invention concerns an induction heating device according to the preamble of claim 1, a shrink-clamping and/or unshrink-unclamping station according to claim 27 and a method for operating the induction heating device according to the preamble of claim 28.

An induction heating device for a shrink-clamping and/or unshrink-unclamping of tools into and/or out of tool holders has already been proposed, with an induction heating unit comprising at least one first inductor and at least one second inductor, wherein the first inductor and the second inductor are configured to respectively expand at least a portion of the tool holder in a shrink-clamping and/or unshrink-unclamping process by inductive heating, and with an electric supply unit.

The objective of the invention is in particular to provide a generic device having advantageous characteristics, in particular heating and/or energy transfer characteristics, regarding a shrink-clamping. The objective is achieved according to the invention by the features of patent claims 1, 27 and 28 while advantageous implementations and further developments of the invention may be gathered from the subclaims.

Advantages of the Invention

The invention is based on an induction heating device for a shrink-clamping and/or unshrink-unclamping of tools into and/or out of tool holders, with an induction heating unit comprising at least one first inductor and at least one second inductor, which is preferably realized separately from the first inductor, wherein the first inductor and the second inductor are configured to respectively expand at least a portion, in particular different portions, of the tool holder by inductive heating in a shrink-clamping and/or unshrink-unclamping process, and with an electric supply unit.

It is proposed that the inductors are configured, for example by a, preferably temporal, controlling of the inductors via a control and/or regulation unit, to output, in particular selectively output, respectively different energies to different sub-regions of a tool holder, which are in a heating operation respectively encompassed by the inductors, as one of the inductors has more windings than the other inductor, in particular by at least 10%, preferably by at least 20% and preferentially by at least 30% more windings, and/or as the electric supply unit is at least configured to operate the first inductor and the second inductor in different manners, in particular temporally different manners, and/or to actuate the first inductor and the second inductor in temporally different manners. This in particular allows achieving advantageous heating characteristics and/or energy transfer characteristics regarding a shrink-clamping. An especially effective and/or precise control of a heating process of a tool holder, in particular a shrink-chuck, may advantageously be enabled. Advantageously especially effective and/or precise control of a thermal expansion of a receiving region of the tool holder for tools is achievable. It is in this way advantageously possible, in particular in comparison to previous induction heating devices which comprise only one inductor or only two structurally identical inductors, to achieve a substantial saving of energy (in a dimension of up to 25% and more) and/or to achieve a substantial saving of time required for each heating process. Advantageously it is possible to prevent too much energy being transferred or having to be transferred to the tool holder in a shrink-clamping process, which could affect a lifespan of the tool holder. In particular, this allows achieving an especially advantageous and/or easy adjustment of a position of a singular point of an induction magnetic field that brings about the heating of the tool holder, i.e. in particular of an alternating electromagnetic field that brings about the heating of the tool holder, said adjustment being advantageously possible, in contrast to previously known solutions, without inductors which are adjustable in their distance to each other, and/or without additional field-shaping elements, in particular between two inductors. This advantageously allows, in particular in a comparison to the previously known solutions mentioned, considerably reducing a mechanical complexity, in particular as an expensive, fault-prone and time-consuming as well as cost-intensive mechanical adjustability of distances between inductors may advantageously be done without. It is moreover advantageously possible to focus an energy transfer to regions of the tool holder which are involved in the shrink-clamping process, i.e. in particular to regions of the tool holder around the receiving region. Advantageously, by means of an appropriate controlling and/or regulation of the inductors which are driven differently, in particular at least temporally differently, an optimization of the heating and/or of the energy transfer may be enabled from the induction heating unit to a plurality of different, in particular differently shaped and/or differently dimensioned, tool holders. Advantageously successful and/or efficient clamping-in and/or unclamping of tools into or from an especially great number of different, in particular differently shaped and/or differently dimensioned, tool holders may be enabled. In this way an especially high level of flexibility, in particular parameter flexibility, of the induction heating device is advantageously achievable, in particular as it is advantageously possible for different parameters of the induction heating unit, for example the activation time and/or the activation schema of the induction magnetic fields of the induction heating unit, and/or of the energy transfer from the induction heating unit to the tool holder, to be flexibly set, regulated and/or controlled in an advantageously simple manner. Advantageously the augmented effectivity, which in particular means the saving of energy, permits a reduction of costs. Moreover, as a result a cooling process following the heating process can advantageously be carried out more quickly, saving even more energy. Advantageously, by the energy saving described it is in many cases even possible to completely dispense with a forced cooling of the tool holder, for example a water cooling, following a damping-in process and/or an unclamping process. In addition, the inductors may also be configured to output substantially equal amounts of energy to the different sub-regions of the tool holder. Advantageously an energy output to a subregion depends on the inductively heatable mass of the tool holder in the subregion.

An "induction heating device" is in particular to mean at least a portion, in particular a sub-assembly, of an induction heating apparatus, in particular of a shrink-clamping and/or unshrink-unclamping station, wherein in particular accessory units for the induction heating apparatus may also be comprised additionally, like for example a sensor unit for measuring a temperature of a tool holder or for measuring an energy consumption during the induction heating process. In particular, the induction heating device may also comprise the entire induction heating apparatus. In particular, the induction heating device is configured to enable a shrink-clamping and/or unshrink-unclamping of tools into and/or from tool holders by a thermal expansion of a receiving region of a tool holder. In particular, the induction heating device is configured for a heating of tool holders. "Configured" is in particular to mean specifically programmed, designed and/or equipped. By an object being configured for a certain function is in particular to be understood that the object fulfills and/or executes said certain function in at least one application state and/or operation state.

By a "tool holder" is in particular a structural component to be understood which is configured for receiving a tool and for a connection of the tool to a machine. In particular, the tool holder is implemented as a tool-machine interface. Preferentially the tool holder is implemented as a tool chuck, in particular a shrink chuck, preferably a heat-shrink chuck. The tool is in particular implemented as a shaft tool, preferably as a rotational shaft tool, for example a drill, a milling tool, a profiling tool and/or a reamer. By a "shrink-clamping of tools into and/or out of tool holders" is in particular a clamping of tools in tool holders to be understood in which firstly a tool receiving opening of the tool holder is thermally expanded, then a tool is introduced into the tool receiving opening, the tool being eventually, after cooling of the tool holder, fixated in the tool holder by a force-fit connection, which in particular comprises at least a friction-fit connection. By an "unshrink-unclamping of tools into and/or out of tool holders" is in particular a releasing of tools to be understood which are fixated in tool holders by a force-fit connection, in particular a friction-fit connection, wherein the tool receiving opening of the tool holder is thermally expanded until the tool fixated in the tool holder can be removed out of the tool holder. By "at least a portion of the tool holder" is in particular at least a region of the tool holder to be understood which comprises the receiving region of the tool holder.

The induction heating unit is in particular configured for creating an induction magnetic field, which preferably means an, in particular high-frequency, alternating electromagnetic field, which in particular has a symmetrical shape. However, alternatively or additionally it is also conceivable that the induction heating unit is configured to create an alternating electromagnetic field having any other shape, for example an asymmetrical shape or a pulsed shape. In particular, the material of the tool holder, which preferably comprises an electrically conductive, e.g. metallic, in particular ferromagnetic, paramagnetic or diamagnetic material, interacts with the alternating electromagnetic field and thereby heats up. In particular, an inductor is a transmitter of a current from the induction heating unit into the tool holder. Preferably the first inductor and/or the second inductor comprise/s an electric conductor with windings. Preferably the first inductor and/or the second inductor respectively are/is implemented as a coil, in particular an induction coil, which creates an alternating electromagnetic field. In particular, the two inductors are configured for heating the portion of a toolholder that is arranged in an interior of the inductors which is arranged around a coil axis. In particular, the two inductors are configured, in the shrink-clamping and/or unshrink-unclamping process, for an inductive heating of different portions of the tool holder, which are arranged above one another in a vertical direction, in particular parallel to the coil axes of the inductors, preferably along a common coil axis of the inductors. In particular, the inductors are implemented differently than further auxiliary windings of the induction heating unit which are, for example, configured for shielding magnetic fields or for supplying further units, like ventilators, LEDs, electric actors, etc. In particular, in an operation state in which the inductors are mounted in the induction heating unit, at least a relative distance of the inductors from each other is at least substantially unchangeable. In particular, the inductors are arranged in the induction heating unit stationarily with respect to each other. In particular, the inductors are immovably fixated in the induction heating unit. Alternatively, it is however also conceivable that at least one of the inductors is arranged movably in the induction heating unit and/or is displaceable within the induction heating unit relative to the other inductor.

The electric supply unit is in particular realized as a current and/or voltage supply unit, preferably as a constant-current or constant-voltage supply unit. The electric supply unit is in particular configured to supply the first inductor and the second inductor with an induction alternating current, in particular with a symmetrical shape. However, alternatively or additionally it is also conceivable that the electric supply unit is configured to generate an alternating induction current with any other shape, e.g. an asymmetrical shape or a pulsed shape. The electric supply unit is in particular configured to supply the first inductor and the second inductor with electric energy. In particular, the electric supply unit comprises a first connection for the first inductor, in particular for supplying the first inductor with an alternating current, preferably a middle-frequency or high-frequency alternating current. In particular, the electric supply unit comprises a second connection for the second inductor, in particular for supplying the second inductor with an alternating current, preferably a middle-frequency or high-frequency alternating current. In particular, each connection of the electric supply unit comprises at least two electric contacts, which are preferentially configured, in case of a connection with one of the inductors, to close an electric circuit. It is in particular conceivable that at least one electric contact of a connection at the same time also realizes an electric contact of a further connection. Consequently, it is possible that the first connection and the second connection together have only three electric contacts (common electric point of the two inductors), or the first connection and the second connection together have four electric contacts (no common electric point of the two inductors). In particular, the electric supply unit comprises at least two alternating current outputs. It is further conceivable that the electric supply unit comprises more than two alternating current outputs, for example a third connection for a third inductor. In particular, the electric supply unit is also configured to operate the first inductor and the second inductor identically, in particular temporally identically. Preferentially the electric supply unit is configured to optionally operate and/or actuate the first inductor or the second inductor identically, in particular temporally identically, or in different manners, in particular temporally different manners. Preferably the first inductor and the second inductor are connected to different connections of the electric supply unit, wherein in particular at least the current supplies of the different connections can be activated and deactivated independently from each other. Alternatively, it would also be conceivable that the electric supply unit is configured to supply both inductors via one single electric connection (i.e. two electric contacts), with the electric supply unit comprising a controlled switch, e.g. a relay, a contactor, a semi-conductor, or the like, by means of which one of the two inductors, for example the second inductor, can be deactivated separately. In particular, in addition or alternatively to the methods and switchings described in the present document, any other methods and switchings are conceivable which are well-known to someone skilled in the art and which permit the two inductors to be operated in different manners, in particular temporally different manners.

In particular, the electric supply unit comprises at least one control and/or regulation unit. A "control and/or regulation unit" is in particular to mean a unit having at least one control electronics component. A "control electronics component" is in particular to mean a unit with a processor unit and with a memory unit and with an operation program that is stored in the memory unit. In particular, the control and/or regulation unit is at least configured for switching on or switching off the current applied at the connections of the current supply of the electric supply unit independently from each other. In particular, the control and/or regulation unit is at least configured to control and/or regulate a current, in particular an amperage of the effective value of the alternating current, that is applied at least at one connection of the current supply of the electric supply unit, preferably at both connections of the current supply of the electric supply unit. In particular, the control and/or regulation unit is at least configured to control and/or regulate a frequency, in particular alternating current frequency, that is applied at least at one connection of the current supply of the electric supply unit, preferably at both connections of the current supply of the electric supply unit. In particular, the control and/or regulation unit is at least configured to control and/or regulate a pulse width that is applied at least at one connection of the current supply of the electric supply unit, preferably at both connections of the current supply of the electric supply unit. In particular, the control and/or regulation unit is at least configured to ensure a phase balance at both connections of the two inductors. In particular, the control and/or regulation unit is at least configured to control and/or regulate an electric energy output via the first connection and/or an electric energy output via the second connection.

"Operating in different manners" is in particular to mean operating in temporally different manners, for example stopping a current feed to the second inductor at a time that differs from a stopping time of the current feed of the first inductor. Preferably, operating in different manners is at least to mean the possibility of the second inductor being deactivated at a different time than the first inductor. Preferably the two inductors are herein always operated at least with a same phase and/or a same frequency, preferentially at least electrically in the same manner. In particular, the electric supply unit is at least configured to operate at least one of the inductors, for example the second inductor, intermittently. In particular, the electric supply unit is at least configured, in a shrink-clamping process or in an unshrink-unclamping process, to operate the two inductors with different total operation periods.

It is moreover proposed that the electric supply unit is configured to operate the two inductors differently in such a way that an energy input, in particular desired energy input, into a first subregion of a tool holder, which is arranged around a receiving region of the tool holder and is in a heating operation encompassed by one of the inductors, is balanced with an energy input, in particular also desired energy input, into a second subregion of the tool holder, which is also arranged around the receiving region of the tool holder and is in the heating operation encompassed by the other one of the inductors, as a result of which in the heating operation a radial expansion of the entire receiving region of the tool holder is at least substantially identical in both subregions, wherein in particular the first subregion has a smaller material thickness or mass than the second subregion. In this way, in particular advantageous heating and/or energy transfer characteristics are achievable in regard to a shrink-clamping. Advantageously a particularly precise and even, in particular radial, expansion of the tool holder may be ensured. In particular, the different energy inputs into the subregions of the tool holder are adjustable by a controlling of the respective total operation durations of the inductors during a single shrink-clamping process or during a single unshrink-unclamping process. For this purpose, preferably the respective optimum energy input for a tool holder, in particular for a tool holder type, is determined by a trial-and-error method. Alternatively, it is however also conceivable that the respective optimum energy input is calculated on the basis of properties (thickness, mass, material, etc.) of the respective tool holders, in particular tool holder types, for example using the control and/or regulation unit. Furthermore, it is alternatively conceivable that the respective energy input is determined or estimated via sensors, e.g. temperature sensors, and is controlled on the basis of sensor data, for example using the control and/or regulation unit. In particular, the first subregion may be situated above or below the second subregion, viewed towards a receiving opening of the tool holder. However, in most cases the subregion having the greater material thickness or mass is arranged in a lower portion of the tool holder, such that, viewed towards the receiving opening of the tool holder, the first subregion is situated above the second subregion. In particular, the balancing of the energy inputs brings about an advantageous temperature gradient in the tool holder, which in particular prevents too great axial expansion of a subregion of the tool holder leading to tensions within the tool holder, which could, for example, result in an undesired narrowing in an upper portion of the receiving region. It is in particular possible to prevent excess heating of a lower subregion of the tool holder which has a higher material thickness, from generating a strong axial expansion, which results in a narrowing of the receiving region in the upper portion having a lower material thickness.

Furthermore, it is proposed that the electric supply unit is configured to operate the first inductor and the second inductor in phase. In this way advantageous electric characteristics are achievable. In particular, a preferably effective and/or preferably simple implementation of the electric supply unit may advantageously be enabled. It is also possible to achieve advantageous induction characteristics, in particular advantageous characteristics of the created alternating electromagnetic fields. By an operation of the inductors "in phase" is in particular to be understood that the alternating currents of the two inductors are in phase. Preferably a phase shift angle, in particular a phase difference, of the alternating current of the first inductor with respect to the alternating current of the second inductor is zero. In particular, the alternating currents of the two inductors, preferably of all inductors, have the same phase. In particular, the electric supply unit is configured to operate the first inductor and the second inductor at a same frequency, preferably at the same alternating current frequency. In particular, the electric supply unit is configured to operate the first inductor and the second inductor with identical pulse widths. Alternatively or additionally, it is however also conceivable that the electric supply unit is configured to operate the first inductor and the second inductor with different pulse widths.

Beyond this it is proposed that in a heating operation the first inductor and the second inductor create magnetic fields having the same direction. It is in this way moreover possible to achieve advantageous induction characteristics, in particular advantageous characteristics of the created alternating electromagnetic fields. It is advantageously possible to ensure an effective heating of the tool holder. By a "heating operation" is in particular an operation to be understood in which at least one inductor, preferably several inductors, is/are flown-through by an alternating current, thus inductively heating at least a portion of a tool holder, By two inductors creating "magnetic fields having the same direction" is in particular to be understood that at least in a state of the alternating electromagnetic field of the inductors being free of electrically conductive components, for example tool holders, at least the magnetic field lines of the alternating electromagnetic fields of the two inductors which extend in a proximity of the coil axes of the inductors have substantially identical orientations. The magnetic field lines of the alternating electromagnetic fields of the two inductors which extend in the proximity of the coil axes of the inductors are in particular at least substantially parallel to one another. "At least substantially parallel" is here in particular to mean an orientation of a direction relative to a reference direction, in particular in a plane, wherein the direction differs from the reference direction in particular by less than 8°, advantageously by less than 5° and especially advantageously by less than 2°. In particular, test bodies located in a space that is encompassed by the windings of the two inductors are subject to forces which are exerted by the respectively same-direction alternating electromagnetic field of the respective inductor and which are oriented in at least substantially identical directions. Advantageously a close magnetic coupling of the alternating electromagnetic fields of the different inductors is achievable.

If the first inductor and the second conductor are electrically connected in parallel, it is in particular possible to create an especially advantageous alternating electromagnetic field, whose energy transfer is in particular precisely and reliably adjustable over a sufficiently large range. Advantageously, in case of a parallel connection of the inductors, one of the two inductors may be switched off at least for a portion of a shrink-clamping process or an unshrink-unclamping process while the other one of the two inductors is in operation. Advantageously an intermittent operation of only one of the two inductors may be enabled.

Advantageously a particularly high degree of flexibility is made possible, in particular regarding a shrink-clamping of differently shaped tool holders.

If moreover the first inductor and the second inductor have a common electric point, an especially simple and cost-efficient implementation of the electric supply unit may advantageously be enabled. In particular, an adjustment of the alternating currents of the two inductors can be simplified. Furthermore, an equality of phases, frequencies and/or pulse widths is achievable in an advantageously simple manner. In particular, the common electric point realizes a common electric reference point for the two inductors, for example for an electric potential. In particular, the common electric point realizes a common electric supply point. However, it is alternatively also conceivable that the two inductors do not have a common electric point, in particular that they are electrically separate from each other. In particular, the two inductors could then be supplied from two separate current sources, preferably alternating-current sources, of the electric supply unit.

It is also proposed that the first inductor (L1) and the second inductor (L2) have differing inductivities. This advantageously allows achieving differing current values, in particular effective current values, in the two inductors. Advantageously the control and/or regulation unit will use, as a reference value for a controlling and/or regulation of the inductors in the heating operation, an effective current value of the inductor that is, viewed relative to the receiving opening of the tool holder the upper inductor, in particular the first inductor. By a "reference value" is in particular, in this context, a parameter to be understood, depending on which one or several further parameters, for example an activation period of the second inductor, is/are determined. It is in particular conceivable that there is more than one reference value. Moreover, it is advantageously possible that different energies are transferred by the two inductors. In particular, this allows achieving advantageous heating and/or energy transfer characteristics in regard to a shrink-clamping, in particular if the tool holder has different material thicknesses along an axial direction of the receiving region. Advantageously a particularly precise and even, in particular radial, expansion of the tool holder can be ensured. In particular, a desired ratio of L1 and L2 is achievable, by differing numbers of windings among other possibilities.

Beyond this it is proposed that the first inductor, which is in the heating operation arranged nearer to a tool receiving opening of the tool holder in an axial direction of the induction heating unit, has an inductivity that is by at least 3%, preferably by at least 5%, advantageously by at least 10% and preferentially by at least 15% greater or smaller than an inductivity of the second inductor, which is in the heating operation arranged farther away from the tool receiving opening in the axial direction of the induction heating unit. As a result, advantageous heating and/or energy transfer characteristics are in particular achievable in regard to a shrink-clamping. Advantageously, different current values, in particular effective current values, which are preferably adapted to a shrink-clamping of customary tool holder types, are achievable in the two inductors. This may advantageously facilitate a controlling and/or regulation of the inductors. Preferentially, in case of a parallel connection of two differently operable inductors, the inductivity of the second inductor is greater than the inductivity of the first inductor (L2>L1; L2=(1.03 to 1.15)*L1). However, a reverse situation is also conceivable. In particular in case of inductors which are connected in series, it is also conceivable that the inductivity of the second inductor is smaller than the inductivity of the first inductor (L2<L1). Principally it is alternatively also conceivable that the inductivities of the two inductors are at least substantially equal or that the second inductor has a greater inductivity than the first inductor, which will however render a controlling of the described activities more difficult. In particular, in case of separate adjustability of the pulse widths of the alternating currents of the two inductors (in the case when there is no common electric point of the inductors), the ratio of the inductivities of the two inductors is of minor relevance as this may be easily compensated via the pulse widths. However, if there is a common electric point of the two inductors, the inductors are only operable with alternating currents having identical pulse widths. Hence an adaption/difference of the inductivities is in this case advantageous.

It is further proposed that the electric supply unit is configured for operating at least one the inductors, preferably at least the second inductor. In a package-wise and/or pulsed manner. This allows achieving advantageous heating characteristics and/or energy transfer characteristics in regard to a shrink-clamping Advantageously differing energy quantities, which are preferentially adapted to a shrink-clamping of customary tool holder types and preferably have differing division ratios, can be transferred by the two inductors. A "package-wise operation" is in particular to mean switching-on and switching-off one inductor before switching off the other inductor. The package-wise operation may comprise one or several "On" phases of the inductor. Preferably the package-wise operation comprises a sequence of periodical or aperiodical "On" phases of the inductor. A "pulsed operation" is in particular to mean an operation with a periodic sequence of "On" phases of the inductor. Depending on a duty cycle of the package-wise and/or pulsed operated, a desired transferred energy quantity can be set, in particular without having to modify a current value, in particular effective current value of the alternating current, or a voltage in particular effective voltage of the parameter, which does not itself realize a reference value but is preferably controlled and/or regulated depending on the reference value.

If the electric supply unit is configured for an, in particular section-wise, controlling and/or regulation of a total energy quantity transferred to the tool holder, an effective and time-saving and energy-saving clamping-in and unclamping of tools may advantageously be enabled. Advantageously, only the exact energy quantity is transferred which is required for an even and sufficient expansion of the receiving region, such that a tool can be inserted or removed. A lifetime of the tool holders can advantageously be augmented. In particular, the induction heating device comprises at least one energy measuring unit. In particular, the energy measuring unit is at least configured to determine an energy that is transferred by the first inductor during a heating operation. In particular, the energy measuring unit is at least configured to determine an energy that is transferred by the second inductor during a heating operation. In particular, the energy measuring unit is configured to determine, preferably independently from whether only one inductor or several inductors is/are in operation, a total energy that is extracted from the intermediate circuit. Preferentially the energy measuring unit is configured for a recording of an effective power extracted from an electric grid. In particular, the control and/or regulation unit is configured, on the basis of the measuring data of the energy measuring unit, to control and/or regulate the inductors, in particular to activate or stop a current flow to the inductors, and/or to set, control and/or regulate an activation schema of the pulsed or package-wise operation of at least one inductor. A "section-wise" controlling and/or regulation of the total energy quantity is in particular to mean individual controlling of the energy transferred by the individual inductors. In particular, the electric supply unit is configured to control and/or regulate a current value, in particular an effective current value of the alternating current, which is applied at the inductors, in particular at least one of the inductors. It is in particular conceivable that a current value, in particular an effective current value of the alternating current, is modifiable during a heating process of a tool holder. For example, following a switching-off of the second inductor, the current value, in particular the effective current value of the alternating current, of the first inductor could be modified, in particular increased or reduced. In particular, a modification of the current value, in particular the effective current value of the alternating current, is brought about by a controlling and/or regulation of the electric supply unit. Preferentially the electric supply unit is configured to keep the current value, in particular the effective current value of the alternating current, which is applied at the inductors, in particular at least one of the inductors, at a constant level. Advantageously the constant current value, in particular effective current value, serves as a basis for the, in particular energy-controlled, actuation of the inductors. In this way it is advantageously possible for an influence of differing conduit lengths (potential drop) or of voltage fluctuations to be automatically compensated. In particular, with a current value, in particular effective current value, of an inductor, preferably the first inductor, being kept at a constant level ($I_{rmsL1}$=constant) and with frequencies and/or pulse widths of the two inductors being advantageously equal, a current value, in particular effective current value, of the second inductor ($I_{rmsL2}$) will result that is proportionate to an inverse ratio of the inductivities of the two inductors ($I_{rmsL1}=I_{rmsL1}*(L1/L2)$). In particular, in such a case the current value, in particular effective current value, is used as a reference value, in particular as a reference value of the controlling and/or regulation of the current supply of the two inductors. Alternatively or additionally, a pure time-controlling of the inductors is conceivable. Herein it is in particular conceivable that the electric supply unit is configured to control and/or regulate a total heating time of the inductors, preferably "On" times of the respective inductors. While this advantageously facilitates the heating process, there will be less precision in an adaption of the energy transfer. In particular, the total energy quantity, in particular the individual energy quantities, and/or the total heating time, in particular the individual heating times of the inductors, depend/depends on a respective tool holder type and/or on a dimension of the tool holder.

If the two inductors having different numbers of windings are electrically connected in series, advantageously an especially simple implementation of the induction heating unit may be enabled, which is optimized in regard to an energy transferred. Advantageously different energies can be transferred, in particular selectively transferred, to different sub-regions of the tool holder without requiring a specific controlling and/or regulation for the two individual inductors. For example, an induction heating unit with the inductors which are electrically connected in series and have different numbers of windings may realize a "low budget" version of the induction heating unit having electrically parallel-connected differently operable inductors, the "low budget" version having comparable advantages with a reduced flexibility regarding differently shaped tool holders. In particular for users who employ only few different tool chuck shapes, this allows keeping acquisition costs low. It is in particular conceivable that a ratio of the numbers of windings of the two inductors is optimized to specific tool chuck shapes, in particular depending on a customer's requirements. In particular, the inductors which are connected in series may be arranged in the induction heating unit such that they are closely adjacent to each other or spaced apart from each other. In a case of the inductors being connected in series, preferably the inductor having more windings than the other inductor will have an inductivity that is greater than the inductivity of the other inductor by at least 3%, preferentially at least 10% and preferably at least 20%.

If furthermore, of the two inductors, the inductor that is in a heating operation farther away from the tool receiving opening of the tool holder has the smaller number of windings, an optimized heating may advantageously be enabled for an expansion of the receiving region of a tool holder with a diameter decreasing towards a tool receiving opening, in particular a conical tool holder. Such conical tool holders are presently the shrink chucks most frequently in use. A "tool receiving opening" of a tool holder is in particular to mean an end of the receiving region of the tool holder which is open towards an outside, such that a tool can be brought into the receiving region via the tool receiving opening.

It is moreover proposed that the electric supply unit is configured to operate the first inductor and the second inductor with a frequency between 5 kHz and 70 kHz, preferably between 8 kHz and 50 kHz. In this way advantageously a high level of flexibility is achievable regarding a shrink-clamping of tools into/from tool holders with different materials, in particular with different conductive materials, preferably with different metals. Advantageously ferromagnetic as well as paramagnetic or diamagnetic materials can thus be heated inductively. In particular, the electric supply unit comprises a frequency generating unit that is configured to generate current pulses with frequencies between 5 kHz and 70 kHz, preferably between 8 kHz and 50 kHz. In particular, the frequency generating unit is configured for a step-wise or preferably continuous modulation and/or adjustment of the frequency of the alternating current transferred to the inductors at least in a range between 5 kHz and 70 kHz, preferably between 8 kHz and 50 kHz. In particular, the electric supply unit, preferably the frequency generating unit, is configured for a step-wise or preferably continuous modulation and/or adjustment of the pulse width of the alternating current transferred to the inductors at least in the range between 0 and 1,000‰, preferably with an accuracy in a ‰ range. Preferentially the electric supply unit is implemented as a mid-frequency electric supply unit. Preferably the electric supply unit is also configured to operate only one of the two inductors, for example only the first inductor, with a frequency between 5 kHz and 70 kHz, preferably between 8 kHz and 50 kHz, in particular also if the other inductor, for example the second inductor, has been switched off.

Beyond this it is proposed that the electric supply unit is configured, in case of at least one of the two inductors being switched off, to control a current feed to the inductor in such a way that an essential demagnetization of the tool and/or the tool holder is brought about. In this way a demagnetization of the tool and/or the tool holder prior to a use of the tool and/or the tool holder is advantageously achievable. Advantageously a high degree of operational safety and/or user-friendliness is thus achievable. For example, chips of magnetic materials do not adhere to a demagnetized tool and/or to a demagnetized tool holder. In particular, for a demagnetization the electric supply unit is configured to prevent a sudden "drop to zero" of a current value of an inductor, in particular at least of the first inductor, if the current of the inductor is switched off. In particular, the electric supply unit is configured, if the current of the inductor is switched off, to have the current value of the inductor, in particular at least of the first inductor, run towards zero in a finite time interval, preferably in a time interval of at least 10 ms, preferably at least 30 ms and preferentially at least 50 ms, in particular in an (at least almost) continuous or step-wise manner with a plurality of little steps (digital controlling).

It is also proposed that the first inductor and the second inductor are arranged in the induction heating unit such that they are closely adjacent to each other. In this way a favorable and/or close magnetic coupling of the alternating electromagnetic fields of the inductors is advantageously achievable. By the inductors being arranged such that they are "closely adjacent to each other" is in particular to be understood, in this context, that the inductors have a distance from each other, in a direction of a coil axis of the inductors, that is smaller than 3 cm, preferentially smaller than 1.5 cm, advantageously smaller than 0.5 cm and preferably smaller than 0.2 cm. Especially preferentially the two inductors contact each other in at least one point.

Furthermore, it is proposed that the induction heating unit is free of field-shaping elements arranged between the first inductor and the second inductor. In this way an, in particular mechanical, particularly simple and/or especially cost-efficient implementation of the induction heating unit is advantageously achievable. By a "field-shaping element" is in particular an element to be understood which is configured to selectively conduct and/or direct a magnetic field, in particular magnetic field lines of a magnetic field. In particular, the induction heating unit is free of a field-shaping element arranged between the first inductor and the second inductor and implemented of a material that is magnetically conductive (magnetic permeability $\mu_r>1$) and at the same time electrically non-conductive. Preferentially the induction heating unit is free of a field-shaping element that is arranged between the first inductor and the second inductor and is implemented of a ferritic material, for example NiZn, MnZn or a composite powder material on an iron-oxide basis. However, an arrangement of such field-shaping elements or further field-shaping elements above and/or below the two inductors, preferably all inductors, of the induction heating unit is conceivable.

If the first inductor and the second inductor have a common winding body, a close magnetic coupling may be enabled in a simple manner. Moreover, a cost-efficient and/or effective production may advantageously be enabled. In particular, the common winding body is made at least partly of a thermally insulating and thermally resistant material. For example, the common winding body is made of a polyimide (PA) plastic, which is preferentially heat-resistant up to 240° C. while in continuous contact with a heat source. Alternatively, the common winding body could also be made of a particularly heat-resistant plastic like polyether ether ketone (PEEK) or of a ceramic. It is in particular also conceivable that the common winding body is implemented to be separable. This advantageously allows a separation and/or an exchange of at least one of the two inductors. Alternatively, it is however also conceivable that the two inductors are wound on two winding bodies which are implemented completely separate from each other. In this way advantageously an especially high level of modularity of the induction heating unit could be achieved.

If moreover the first inductor and the second inductor are wound such that they are free of overlap with each other, an easy separability of the inductors may advantageously be enabled. Furthermore, in this way a magnetic field configuration is achievable which is advantageous for certain tool chucks. In particular, the first inductor and the second inductor are wound on the common winding body such that they are free of overlap with each other. Alternatively, it is however also conceivable that the first inductor and the second inductor are wound on separate winding bodies such that they are free of overlap with each other.

If instead of this the first inductor and the second inductor are wound such that they partially overlap, an especially high compactness of the induction heating device is advantageously achievable. Furthermore, this allows achieving a magnetic field configuration that is advantageous for certain tool chucks. In particular, it is possible that the first inductor and the second inductor are wound in such a way that they overlap with each other conically or stepped. In particular, the first inductor and the second inductor are wound on the common winding body such that they overlap with each other.

Beyond this it is proposed that a total winding height of the two inductors in an axial direction of the induction heating unit is smaller than a maximum standardized clamp-in length of the tool holders, which are in particular thermally tensionable by the induction heating unit, and is in particular smaller than 50 mm. In this way advantageously an especially even heating, and thus thermal expansion, of the tool holder is achievable. As a result, it is advantageously possible for an effect of a heat conduction within the tool holder, causing a heating and expansion of the tool holder beyond a directly inductively heated region, to be included in a calculation and/or to be reduced. Advantageously, as a result an effect of stray fields, which cause a heating and expansion of the tool holder beyond a directly inductively heated region, can be included in a calculation and/or can be reduced. This advantageously allows achieving a selective and/or optimized controlling and/or regulation of the heating process. The standardized clamp-in length of the tool holders at least substantially corresponds to an axial length of the receiving region of the tool holder.

If at least the first inductor and/or the second inductor are/is wound conically and/or stepped, advantageously a high level of compactness of the induction heating unit and/or an especially advantageous magnetic field configuration for certain tool chucks are/is achievable.

It is further proposed that the electric supply unit comprises an, in particular modified, H-bridge circuit, in particular three-way H-bridge circuit, in particular with at least two alternating current outputs. As a result, an at least temporally differing operability of at least two inductors may be enabled with the same frequencies, phases and/or pulse widths. It may advantageously be facilitated to switch off one of the inductors at least for time intervals while the other inductor remains in operation. Advantageously a package-wise operation of at least one of the two inductors may be enabled, in particular while the other inductor is operated continuously. By a "modified H-bridge circuit" is in particular an H-bridge circuit to be understood which is different from a two-way circuit and is preferably different from a three-phase bridge circuit, like it is for example used in motor controlling. In particular, the (modified) H-bridge circuit is implemented as a three-way circuit, preferentially comprising two alternative current outputs which are switchable, i.e. activatable and deactivatable, separately from each other. In particular, the (modified) H-bridge circuit has three electric outputs, preferably with a common electric point. In particular, the electric supply unit, preferably at least the electric circuit of the electric supply unit which generates the alternating currents for the two inductors, is free of a resonant circuit. Alternatively or additionally, the (modified) H-bridge circuit may also comprise more than three ways and/or more than two alternating current outputs. In particular, a power circuit of the electric supply unit comprises a hardchopper. In particular, the hardchopper is configured to generate from a grid current a direct current, which is then converted into the alternating current with the desired frequency by the (modified) H-bridge circuit, in particular via a suitable switching of the (modified) H-bridge circuit. It is in particular also conceivable that the electric supply unit of the implementation having inductors with differing numbers of windings comprises a H-bridge circuit, which in this case may then in particular have only one alternating current output. It is further as well conceivable that both inductors, which are in particular connected in parallel to each other, are switched with only one normal H-bridge, wherein one of the two inductors, in particular the second inductor, is in this case provided with a separate, in particular external or internal, switch, via which the inductor can be switched on and/or off in a controlled and/or regulated manner.

It is also proposed that the induction heating unit comprises at least one third inductor, which is operable via the electric supply unit, in particular in a different manner than at least one of the two other inductors. In this way in particular advantageous heating characteristics and/or energy transfer characteristics are advantageously achievable regarding a shrink-clamping. Advantageously an especially effective and/or precise control of a heating process of a tool holder, in particular a shrink chuck, can be rendered possible. Advantageously this allows particularly effective and/or precise control of a thermal expansion of a receiving region of the tool holder for tools. In this way, advantageously a secure and energy-efficient tensioning and/or de-tensioning of shrink chucks having unusual shapes and/or having an overlength are/is possible. In particular, depending on an implementation of the electric supply unit, the third inductor may be operable together with one of the inductors or in a manner that is at least temporally different from the two inductors. In particular, the electric supply unit is configured to operate the third inductor in phase with the two other inductors or, if one of the two other inductors is inactive, with the other one of the two other inductions. In particular, the third inductor is configured to create an alternating electromagnetic field having the same direction as the alternating electromagnetic field of the first inductor and/or the alternating electromagnetic field of the second inductor. Preferentially the alternating electromagnetic field of the third inductor has in a heating operation the same direction as the alternating electromagnetic fields of the two other inductors. In particular, the third inductor is closely magnetically coupled with the first inductor and/or with the second inductor. It is in particular conceivable that the third inductor has a common electric point with the first inductor and/or with the second inductor. In particular, the electric supply unit may be configured to operate the third inductor in a package-wise and/or pulsed manner. In particular, the electric supply unit is configured to operate the third inductor with a frequency between 5 kHz and 70 kHz. In particular, the induction heating unit is free of field-shaping elements arranged between the third inductor and one of the two other inductors. In particular, the third inductor is arranged in an axial direction beside the two other inductors or between the two other inductors. In particular, the first inductor, the second inductor and the third inductor have at least substantially identical coil axes. In particular, the windings of the first inductor, the second inductor and/or the third inductor are centered around at least substantially identical coil axes. It is conceivable that the third inductor is wound such that it is free of overlap or at least partially overlapping with the first inductor and/or with the second inductor. It is conceivable that the third inductor is wound in conically and/or stepped. In particular, the induction heating unit comprising three inductors has a greater maximum clamp-in length than the induction heating unit comprising two inductors.

Beyond this it is proposed that the third inductor is additionally connected and/or can be additionally connected electrically in parallel to the first inductor and/or to the second inductor. In this way an optional prolongation of a clamp-in length of the induction heating unit is advantageously achievable. Advantageously an especially high flexibility is achievable. In particular, the third inductor is configured for heating a third subregion of a tool holder, which is arranged around a receiving region of the tool holder and is in a heating operation encompassed by the third inductor.

It is furthermore proposed that the third inductor has a greater inductivity (L3) than the first inductor and/or than the second inductor (L3>L2 and L3>L1). In this way an especially advantageous heating of the tool holder is achievable. It is, for example, achievable that the third inductor just lightly assists in heating a lower part of the tool holder, which preferably allows avoiding tensions, in particular axial tensions, which could affect an even expansion of the receiving region.

If in addition at least one of the inductors is removable out of the induction heating unit and/or exchangeable without destruction, advantageously a high degree of modularity of the induction heating unit is achievable. Advantageously an adaption of a composition of the induction heating unit to a certain tool chuck geometry can be achieved. As a result, a clamping-in process and/or an unclamping process may be advantageously optimized, in particular optimized in terms of energy and/or time. It is conceivable that each inductor is separately removable from the induction heating unit and/or exchangeable without destruction as well as combinable with other inductors, and/or that packages of a plurality of inductors, for example two inductors or three inductors, can together be removed from the induction heating unit and/or exchanged without destruction.

Moreover, a kit is proposed, with an induction heating unit of the induction heating device and with a plurality of differently dimensioned inductors and/or different packages of inductors, which can be combined in the induction heating unit in different ways. By way of this a high modularity of the induction heating unit is advantageously achievable. Advantageously this allows achieving an adaption of a composition of the induction heating unit to a certain tool chuck geometry.

In addition, a shrink-clamping and/or unshrink-unclamping station for tools is proposed, with the induction heating device and/or with the kit. In this way in particular advantageous heating characteristics and/or energy transfer characteristics regarding a shrink-clamping are achievable. Advantageously an especially effective and/or precise control of a heating process of a tool holder, in particular a shrink chuck, can be enabled. By a "shrink-clamping and/or unshrink-unclamping station for tools" is in particular an appliance to be understood which is configured to carry out the shrink-clamping process and/or the unshrink-unclamping process of tools in tool holders in an at least largely automated manner, preferably in a fully automated manner. The shrink-clamping process in particular comprises all steps necessary for a fixation of the tool in the tool holder, in particular including the insertion of the tool and/or the tool holder into the shrink-clamping and/or unshrink-unclamping station. The unshrink-unclamping process in particular comprises all steps necessary for a release of the tool out of the tool holder, in particular including the removal of the tool and/or of the tool holder out of the shrink-clamping and/or unshrink-unclamping station. In particular, the shrink-clamping and/or unshrink-unclamping station for tools is also configured for an exchange of tools situated in a tool holder. In particular, the shrink-clamping and/or unshrink-unclamping station may be realized as an integral component of an, in particular optical, measuring and/or presetting apparatus for tools. By a "measuring and/or presetting apparatus for tools" is in particular an apparatus to be understood which is at least configured to at least partly capture and/or set at least a length, at least an angle, at least a contour and/or at least an outer shape of a tool, preferably to execute a setting, in particular a presetting, of a tool, in particular in the tool holder, for example in terms of a relative length and/or position with respect to the tool holder.

Furthermore, a method is proposed for operating the induction heating device for a shrink-clamping and/or unshrink-unclamping of tools into and/or out of tool holders, with the induction heating unit comprising at least the first inductor and at least the second inductor which is realized separately from the first inductor, wherein by means of the first inductor and by means of the second inductor respectively at least a portion, in particular different portions, of the tool holder is/are expanded by inductive heating in a shrink-clamping and/or unshrink-unclamping process, wherein in a heating operation for expanding a tool holder the first inductor and the second inductor are operated and/or actuated in different manners, in particular at least temporally different manners. In this way in particular advantageous heating characteristics and/or energy transfer characteristics regarding a shrink-clamping are achievable. Advantageously an especially effective and/or precise control of a heating process of a tool holder, in particular a shrink chuck, is achievable.

If in the heating operation for an expansion of the tool holder one of the two inductors is overall supplied with a current longer than the other inductor, advantageously an energy input of the tool holder can be optimized such that an especially even expansion of the receiving region is enabled. In particular, at least the inductor that is in the heating operation arranged closer to the tool receiving opening of the receiving region, preferably the first inductor, is supplied with the current longer than the further inductor/s, in particular the second inductor. In this way it is advantageously possible to prevent excess heating of the portion of the tool holder having the greater mass, which is in particular arranged closer to an inner diameter of the inductors and is thus subject to a higher energy input with an equal alternating electromagnetic field.

If moreover the heating operation of at least one of the inductors is automatically terminated after reaching a predetermined energy transferred from the inductor to the tool holder or after reaching a predetermined percentage of a given total energy of all inductors, it is advantageously possible to optimize, preferably considerably reduce an energy consumption and/or a required time per clamping process, in particular as a more than necessary heating of the tool holder in a clamping process (temperature and/or duration of heating) can be avoided. Advantageously overheating and/or possible damaging of the tool holder can be prevented. Alternatively, it is also conceivable that the heating operation of at least one of the inductors is automatically terminated when a predetermined running period of one or several inductors has been reached.

The induction heating device according to the invention, the kit according to the invention, the shrink-clamping and/or unshrink-unclamping station according to the invention and/or the method according to the invention are herein not to be limited to the application and implementation described above. In particular, to fulfill a functionality that is described here, the induction heating device according to the invention, the kit according to the invention, the shrink-damping and/or unshrink-unclamping station according to the invention and/or the method according to the invention may comprise a number of individual elements, components, method steps and units that differs from a number given here.

DRAWINGS

Further advantages will become apparent from the following description of the drawings. In the drawings eight exemplary embodiments of the invention are illustrated. The drawings, the description and the claims contain a plurality of features in combination. Someone skilled in the art will purposefully also consider the features separately and will find further expedient combinations.

Figure 2:
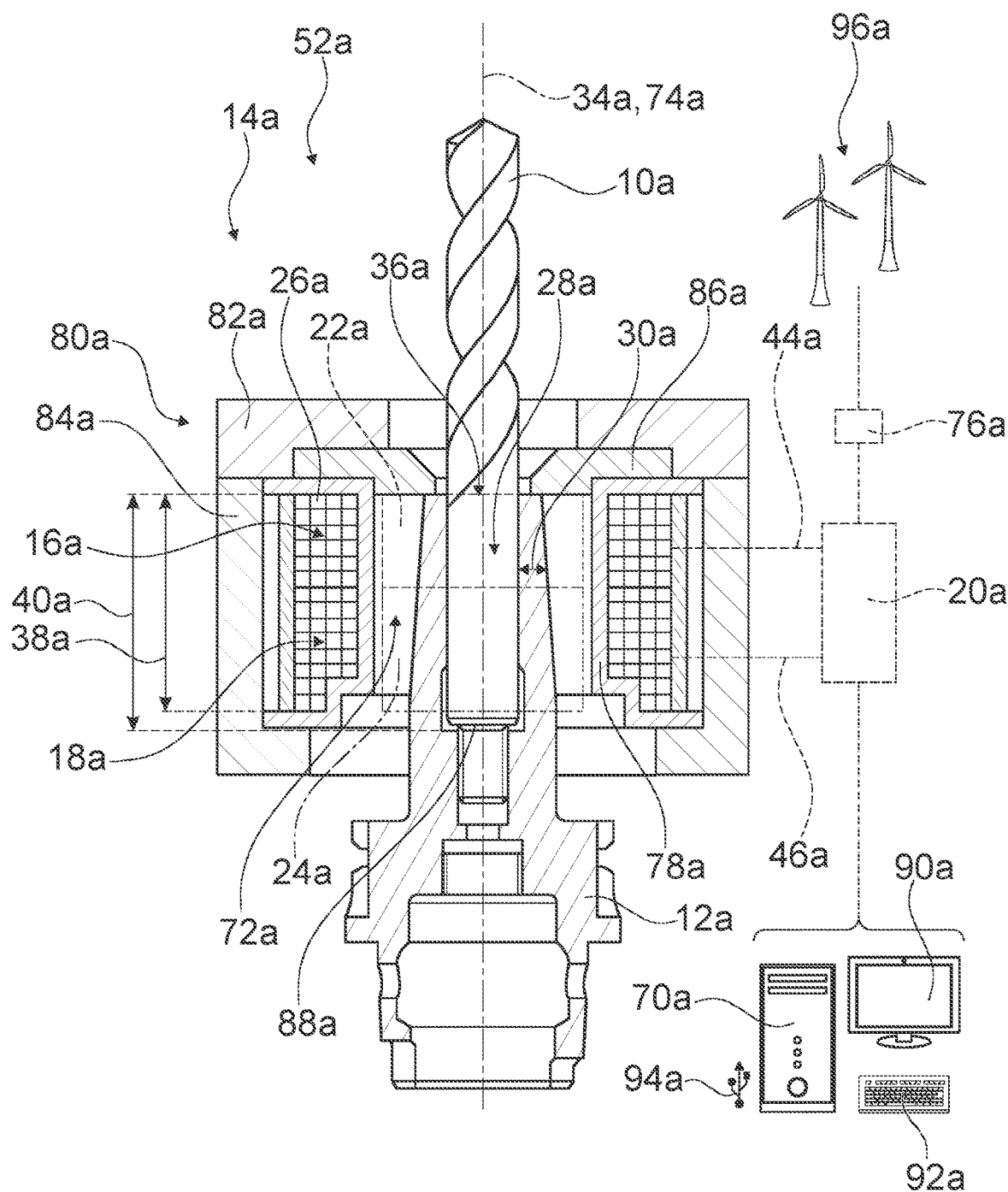
Figure 4:
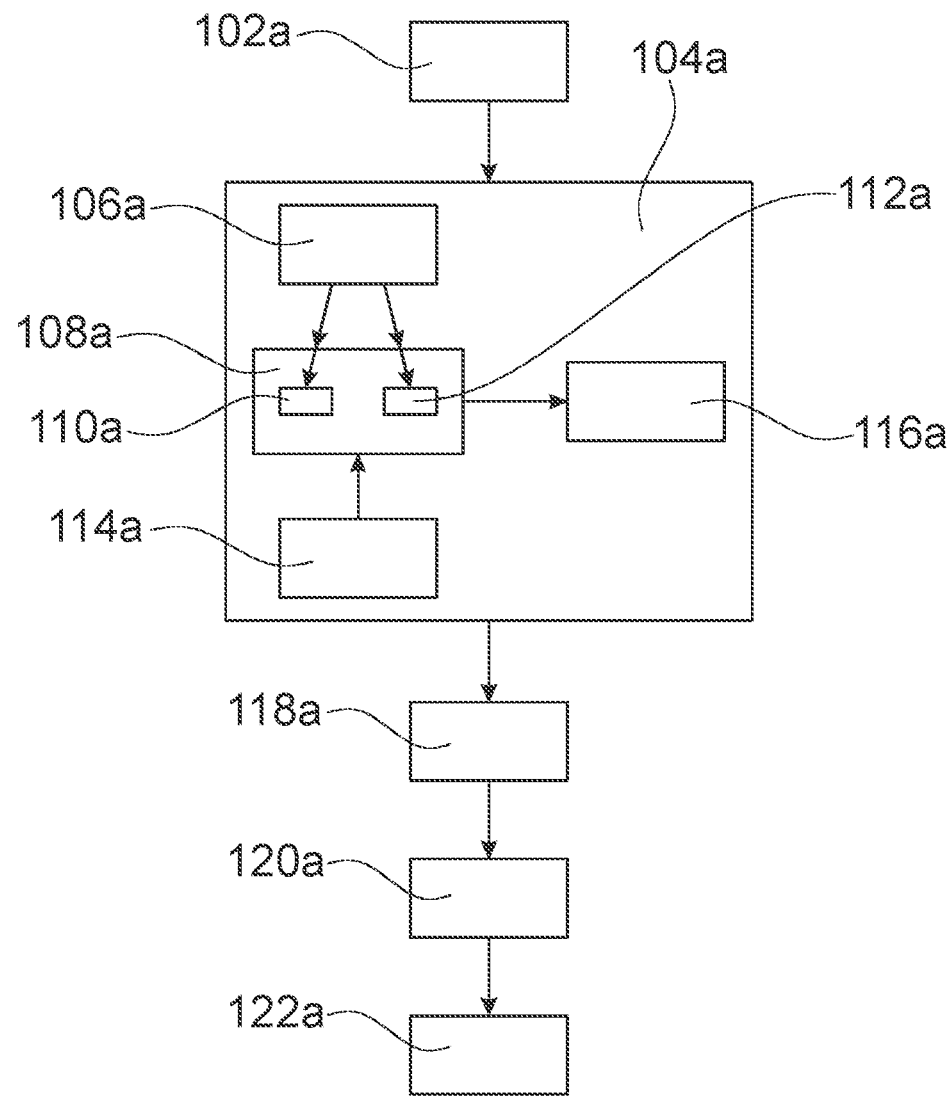
Figure 5A:
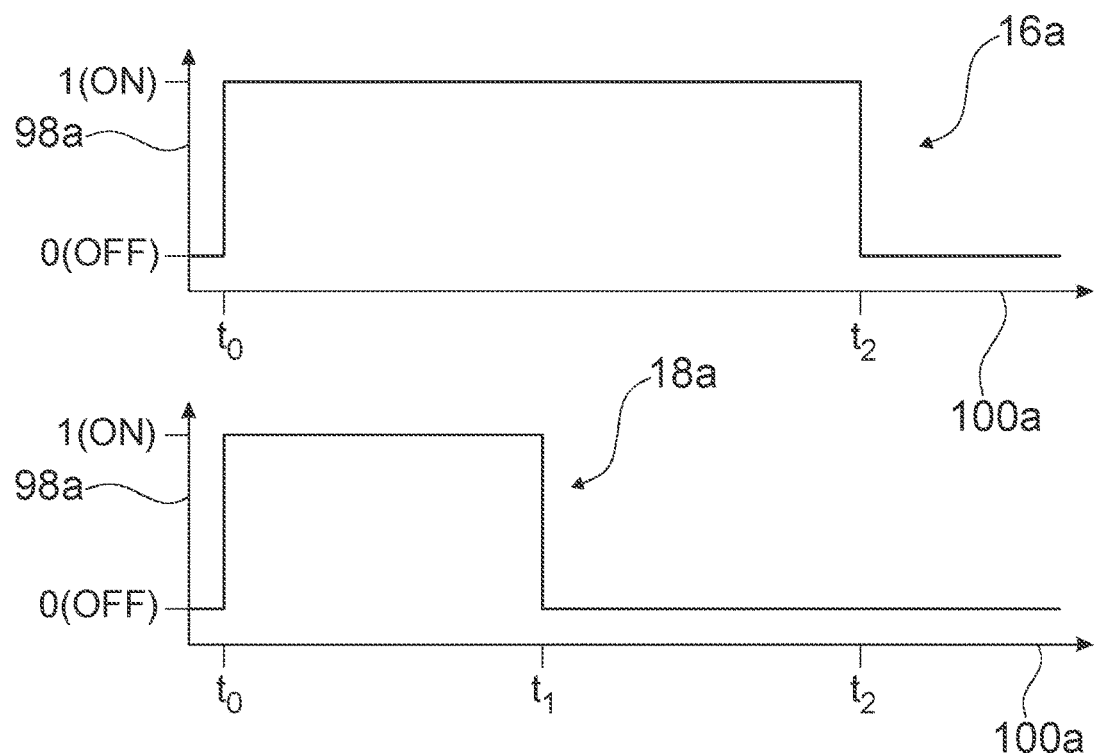
Figure 5B:
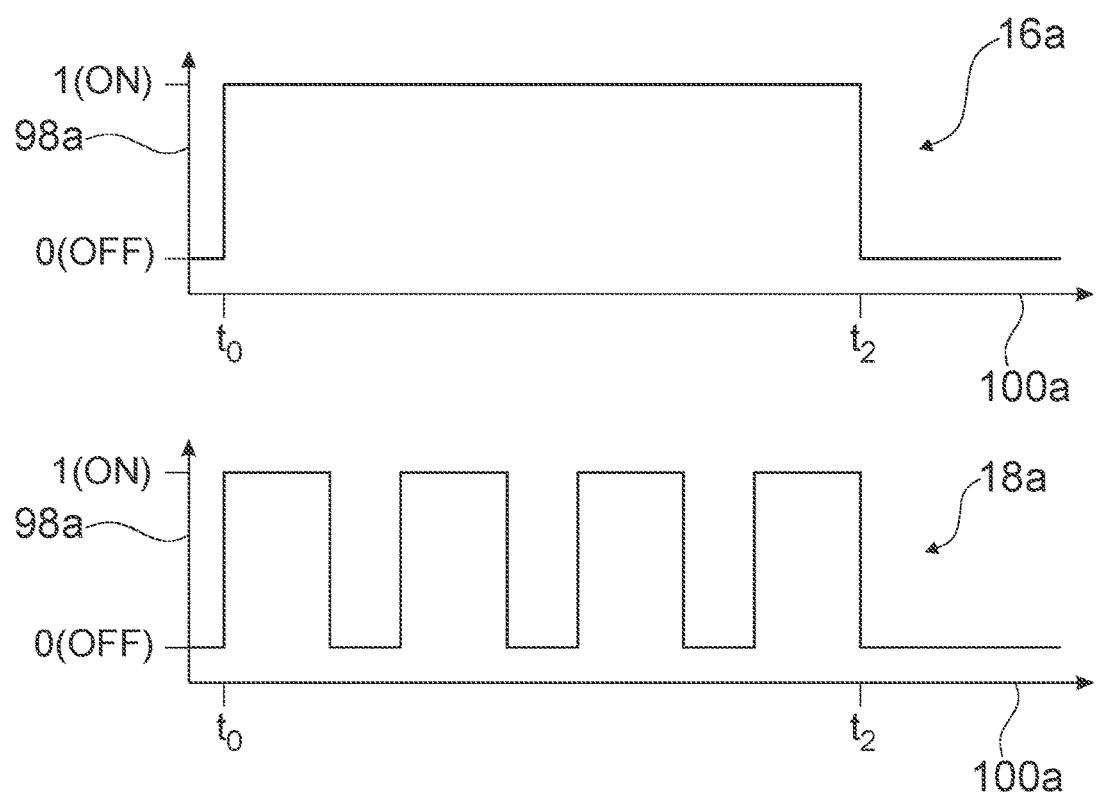
Figure 6:
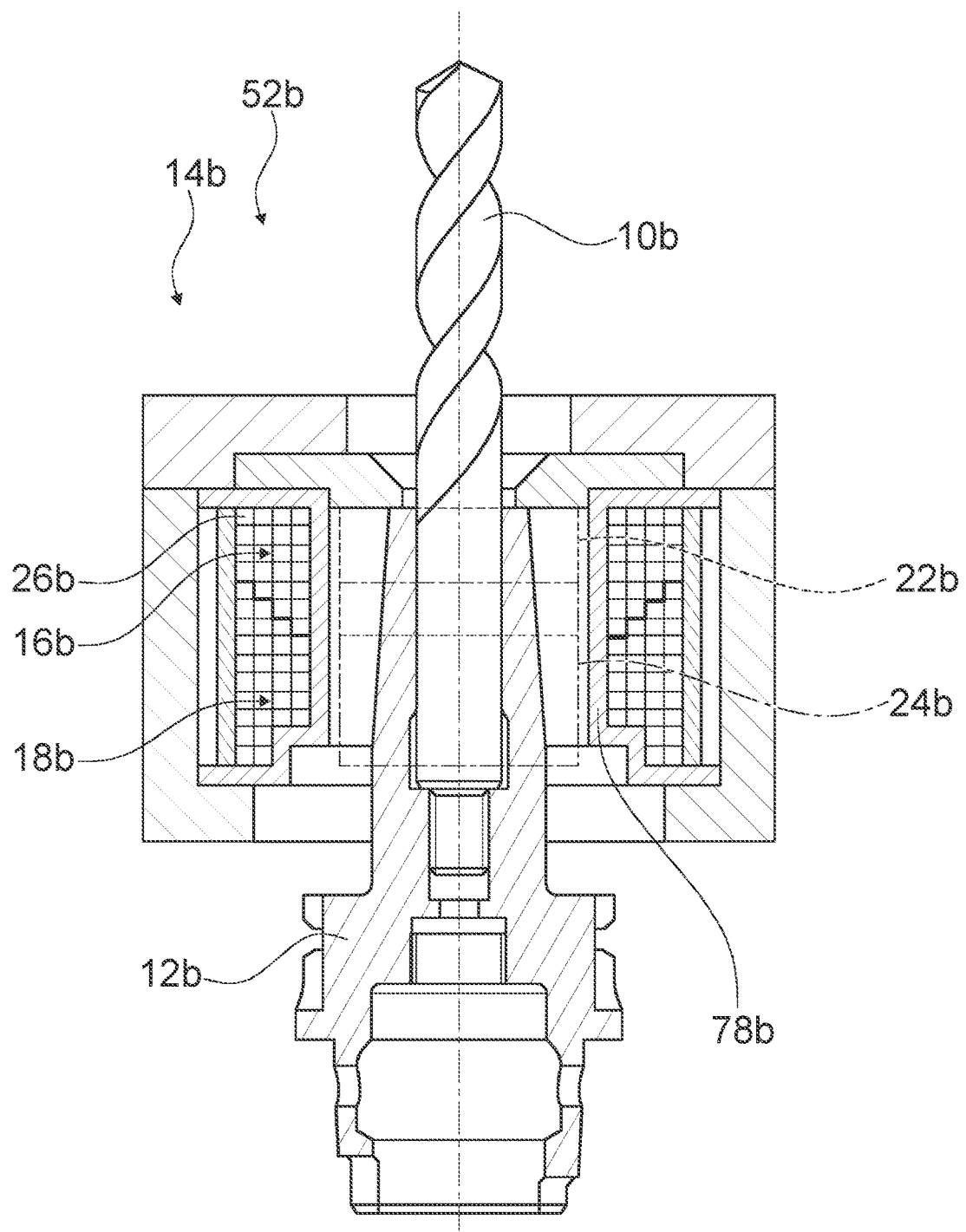
Figure 7:
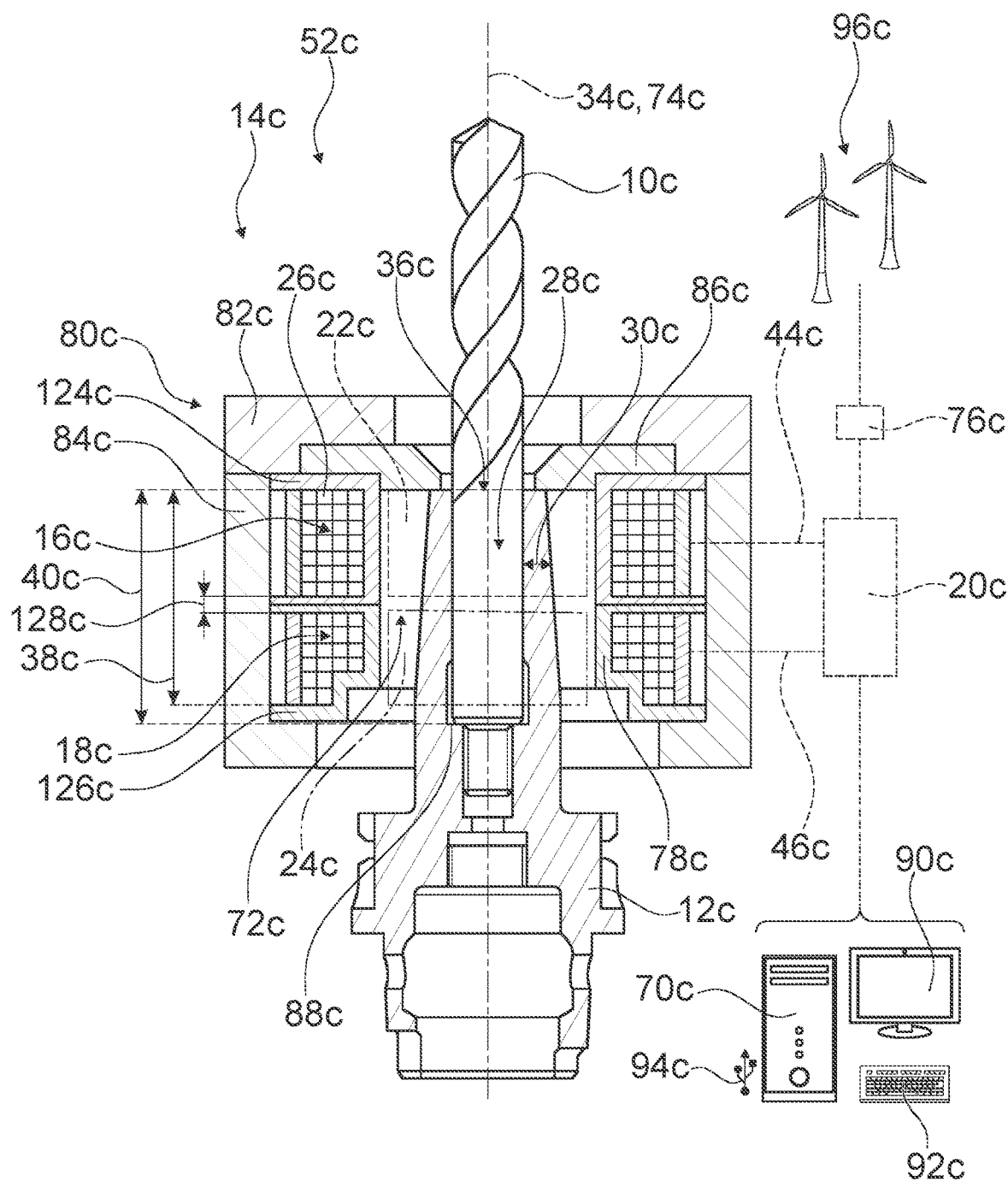
Figure 10A:
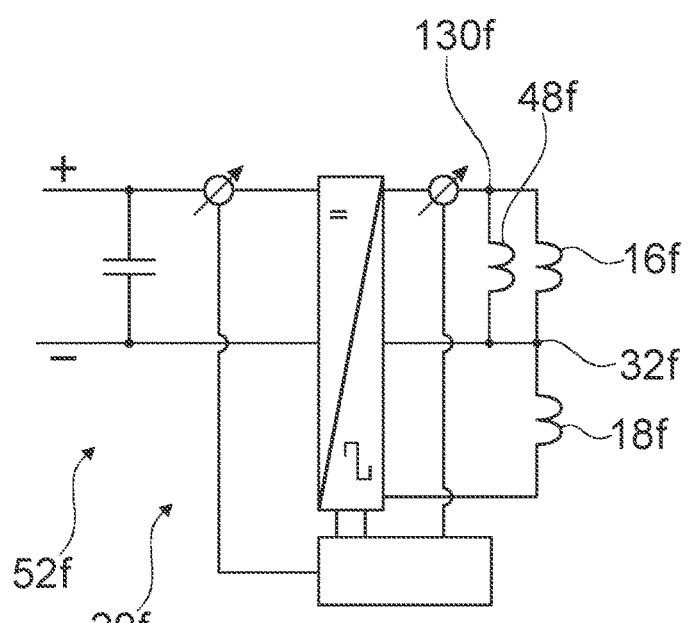
Figure 10B:
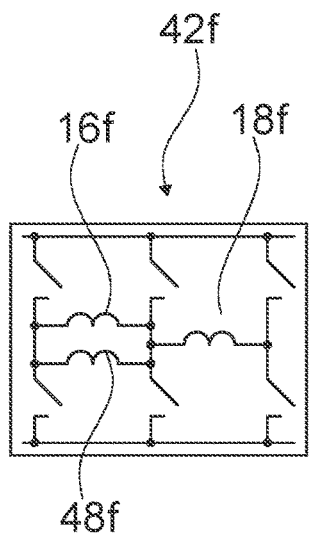
Figure 11A:
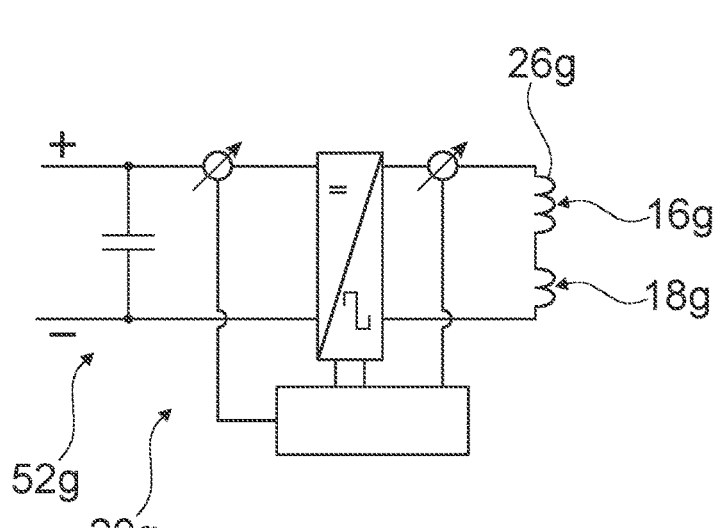
Figure 11B:
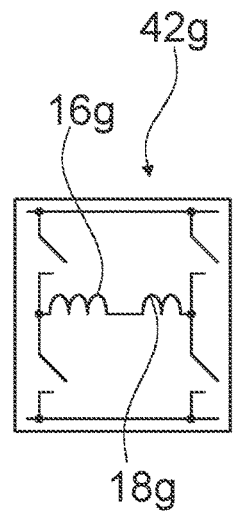
Figure 12:
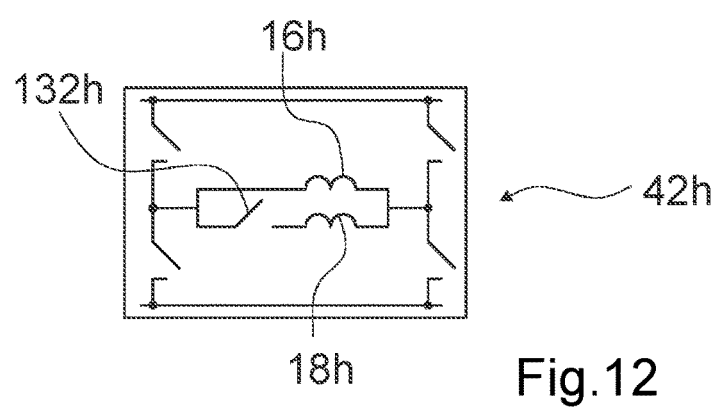

It is shown in:

FIG. 1 a schematic perspective view of a shrink-clamping and/or unshrink-unclamping station with an induction heating device, FIG. 2 a schematic sectional view of an induction heating unit of the induction heating device with a tool holder, FIG. 3a a schematic circuit diagram of an electric supply unit of the induction heating device, FIG. 3b a schematic circuit diagram of a modified H-bridge circuit of the electric supply unit, FIG. 3c a schematic current-time diagram of the current feed of one of the two AC outputs of the electric supply unit, FIG. 4 a schematic flow chart of a method for operating the induction heating unit, FIG. 5a a schematic activity-time diagram of inductors of the induction heating unit, FIG. 5b an alternative schematic activity-time diagram of the inductors of the induction heating unit, FIG. 6 a schematic sectional view of an alternative induction heating unit of an alternative induction heating device, FIG. 7 a schematic sectional view of a second alternative induction heating unit of a second alternative induction heating device, FIG. 8a a schematic circuit diagram of an electric supply unit of a third alternative induction heating device, FIG. 8b a schematic circuit diagram of H-bridges of the third alternative induction heating device, FIG. 9a a schematic circuit diagram of an electric supply unit of a fourth alternative induction heating device, FIG. 9b a schematic circuit diagram of a modified H-bridge circuit of the fourth alternative induction heating device, FIG. 10a a schematic circuit diagram of an electric supply unit of a fifth alternative induction heating device, FIG. 10b a schematic circuit diagram of a modified H-bridge circuit of the fifth alternative induction heating device, FIG. 11a a schematic circuit diagram of an electric supply unit of a sixth alternative induction heating device, FIG. 11b a schematic circuit diagram of a modified H-bridge circuit of the sixth alternative induction heating device, and FIG. 12 a schematic circuit diagram of an H-bridge circuit of a seventh alternative induction heating device.

DESCRIPTION OF THE EXEMPLARY EMBODIMENTS

FIG. 1 shows a shrink-damping and/or unshrink-unclamping station 54a. The shrink-damping and/or unshrink-unclamping station 54a is configured for tools 10a. The shrink-damping and/or unshrink-unclamping station 54a is implemented as a shrink-clamping station. The shrink-clamping and/or unshrink-unclamping station 54a may be part of a presetting and/or measuring apparatus for tools 10a and/or part of a multi-clamping and measuring and/or presetting station, for example like the one that is described in a German patent application with the application number 10 2019 115 607.6.

The shrink-clamping and/or unshrink-unclamping station 54a comprises a base frame 56a at, in or on which the functional units of the shrink-clamping and/or unshrink-unclamping station 54a are mounted. The shrink-clamping and/or unshrink-unclamping station 54a comprises a holding device 58a for tool holders 12a. The holding device 58a comprises a length adjustment pin 60a for a presetting of an insertion depth for a tool 10a in the tool holder 12a. The length adjustment pin 60a is configured to be pushed into the tool holder 12a from below, thus forming an abutment for a tool 10a which is inserted into the tool holder 12a in a shrink-clamping process. Alternatively, or additionally, the length adjustment pin 60a may be configured, in an unshrink-unclamping process, to exert a pressure from below onto a tool 10a in the tool holder 12a, by which the tool 10a is pushed out of the tool holder 12a as soon as the tool holder 12a has been thermally expanded to a sufficient width.

In the holding device 58a shown in FIG. 1, the tool holder 12a is positioned, which is implemented as a shrink chuck. In the tool holder 12a exemplarily shown in FIG. 1, an exemplary tool 10a is fixated. The tool 10a shown is implemented as a shaft tool, in particular as a spiral drill. The tool 10a shown has a tool shaft 62a. Alternatively the tool 10a could also be implemented as a shaft tool that differs from a spiral drill (for example as a milling tool). The tool 10a is configured to be fixated, in particular thermally clamped, in the tool holder 12a. The tool holder 12a and the tool 10a that is clamped in the tool holder 12a form a mounted tool unit. The tool holder 12a comprises a receiving region 28a that is to be heated. The receiving region 28a is configured for receiving the tool shaft 62a. The receiving region 28a of the tool holder 12a, in which the tool 10a is fixated in a shrink-clamping process, is oriented parallel to a rotation axis 64a of the tool holder 12a.

The shrink-clamping and/or unshrink-unclamping station 54a comprises an induction heating device 52a. The shrink-clamping and/or unshrink-unclamping station 54a comprises a tower 66a. The tower 66a comprises bearing rails 68a. The induction heating device 52a is linearly movable up and down along the bearing rails 68a. The induction heating device 52a is movable towards the holding device 58a along the bearing rails 68a. The shrink-clamping and/or unshrink-unclamping station 54a may comprise a gripper device (not shown), which is configured to grip a tool 10a or a tool holder 12a and to move the tool 10a or the tool holder 12a horizontally and vertically relative to the holding device 58a.

The induction heating device 52a is configured for an unshrink-unclamping of tools 10a out of a tool holder 12a. Alternatively or additionally the induction heating device 52a is configured for a shrink-clamping of tools 10a into a tool holder 12a. The induction heating device 52a comprises an induction heating unit 14a. The induction heating unit 14a comprises a first inductor 16a. The induction heating unit 14a comprises a second inductor 18a. The first inductor 16a and the second inductor 18a are realized separately from each other. The inductors 16a, 18a are respectively configured to thermally expand a different portion of the tool holder 12a, in particular different subregions 22a, 24a (see FIG. 2) of the tool holder 12a. In a heating operation the first inductor 16a and the second inductor 18a create magnetic fields having the same direction. The inductors 16a, 18a are configured to output respectively different energies to different subregions 22a, 24a of the tool holder 12a, which are in a heating operation respectively encompassed by the inductors 16a, 18a. In the illustrated case the first inductor 16a is configured to output energy to the first subregion 22a of the tool holder 12a.

The first subregion 22a of the tool holder 12a is in the illustrated case implemented as an upper, in particular narrower, subregion of the tool holder 12a. In a heating operation the first subregion 22a is encompassed by the first inductor 16a. In the illustrated case the second inductor 18a is configured to output energy to the second subregion 24a of the tool holder 12a. The second subregion 24a of the tool holder 12a is in the illustrated case implemented as a lower, in particular thicker, subregion of the tool holder 12a. In a heating operation the second subregion 24a is encompassed by the second inductor 18a.

The induction heating unit 14a is configured to be put over the tool holder 12a and over the tool 10a, The induction heating unit 14a forms a work region 72a. The work region 72a of the induction heating unit 14a is realized as a central, in particular vertically oriented, preferably at least substantially cylindrical or conical, opening in the induction heating unit 14a. The opening of the work region 72a extends completely through the induction heating unit 14a, The work region 72a extends parallel to a coil axis 74a of the inductors 16a, 18a. The work region 72a has an axial direction 34a. The axial direction 34a of the work region 72a extends parallel to the coil axis 74a of the inductors 16a, 18a. The work region 72a is oriented parallel to the designated rotation axis 64a of the tool holder 12a and/or the tool 10a, in particular when the tool holder 12a is inserted in the work region 72a and/or when the tool holder 12a is positioned in the holding device 58a of the shrink-clamping and/or unshrink-unclamping station 54a. The inductors 16a, 18a are non-destructively removable from the induction heating unit 14a. The inductors 16a, 18a are non-destructively exchangeable. The shrink-clamping and/or unshrink-unclamping station 54a comprises a kit 50a with a plurality of different inductors 16a, 16'a, 16"a, 16'''a, 16''''a, 18'a, 18"a, 18'''a, 18''''a. The different inductors 16a, 16'a, 16"a, 16'''a, 16''''a, 18a, 18'a, 18"a, 18'''a, 18''''a of the kit 50a are differently dimensioned, in particular differently regarding a diameter or a length. The different inductors 16a, 16'a, 16"a, 16'''a, 16''''a, 18a, 18'a, 18"a, 18'''a, 18''''a can be combined in the induction heating unit 14a in different ways. Alternatively, it is however also conceivable that the inductors 16a, 18a are fixedly mounted in the induction heating unit 14a, such that a non-destructive removal and/or non-destructive exchange are/is not possible.

FIG. 2 shows a sectional view of the induction heating unit 14a with the tool holder 12a and the tool 10a (non-sectioned). The tool holder 12a comprises the receiving region 28a. The tool 10a is completely inserted in the receiving region 28a. The receiving region 28a of the tool holder 12a has on one end a tool receiving opening 36a. The tool 10a is inserted in the receiving region 28a through the tool receiving opening 36a. The receiving region 28a has a standardized clamp-in length 40a. The standardized clamp-in length 40a extends from the tool receiving opening 36a to an abutment 88a, which predetermines a maximum insertion depth of the receiving region 28a. The exemplarily shown tool holder 12a has, at least in a region around the receiving region 28a, a conical outer shape. The tool holder 12a has a varying material thickness 30a in the region around the receiving region 28a. The material thickness 30a of the tool holder 12a increases in a direction that starts from the tool receiving region 36a and follows the axial direction 34a. The material thickness 30a of the tool holder 12a increases downwards.

The inductors 16a, 18a respectively comprise windings 26a. In FIG. 2 individual windings 26a are schematically depicted as little boxes. In the case shown the numbers of windings 26a of the first inductor 16a and the second inductor 18a differ from each other. The inductor 16a, 18a of the two inductors 16a, 18a which is in the heating operation farther away from a tool receiving opening 36a of the tool holder 12a has a greater number of windings 26a. In the case shown the second inductor 18a has the greater number of windings 26a. In the case shown the second inductor 18a has a greater inductivity than the first inductor 16a. The first inductor 16a and the second inductor 18a are arranged in the induction heating unit 14a such that they are closely adjacent to each other. The first inductor 16a and the second inductor 18a mutually contact each other. The first inductor 16a and the second inductor 18a are arranged in the induction heating unit 14a such that they are immovable and/or positionally fixed relative to each other. The induction heating unit 14a is free of field-shaping elements arranged between inductors 16a, 18a, 48a (see also FIG. 7). The induction heating unit 14a is free of field-shaping elements arranged between the first inductor 16a and the second inductor 18a. On a radial outer side the inductors 16a, 18a are covered with a ferritic element 86a. The ferritic element 86a is configured for conducting the magnetic field lines of the alternating electromagnetic field of the inductors 16a, 18a.

The induction heating unit 14a comprises a common winding body 78a, The windings 26a of the inductors 16a, 18a are wound onto the common winding body 78a. In the case shown the first inductor 16a and the second inductor 18a are wound free of overlap with each other. In FIG. 2 the separation between the inductors 16a, 18a is schematically depicted as a line having a higher line thickness. In the case shown the common winding body 78a is implemented to be non-dividable. It is however also conceivable that the common winding body 78a is implemented to be dividable or that each inductor 16a, 18a has a separate winding body. Together the windings 26a of the inductors 16a, 18a have a total winding height 38a in the axial direction 34a of the induction heating unit 14a. The total winding height 38a of the two inductors 16a, 18a is smaller than the maximum standardized clamp-in length 40a of the tool holders 12a. The total winding height 38a of the two inductors 16a, 18a is smaller than 50 mm. The maximum standardized clamp-in length 40a is in the present case at least 50 mm, preferably exactly 50 mm.

The induction heating unit 14a comprises a housing unit 80a, The housing unit 80a forms an outer shell of the induction heating unit 14a. The housing unit 80a comprises a housing cover 82a and a housing shell 84a. The inductors 16a, 18a are arranged within the housing unit 80a. The housing cover 82a is removable from the housing shell 84a without destruction. This advantageously enables a removal and/or an exchange of the inductors 16a, 18a out of the housing shell 84a. The housing unit 80a may, for example, be formed of a magnetic field conducting and/or magnetic field shielding material.

The induction heating device 52a comprises an electric supply unit 20a. The electric supply unit 20 an is configured to operate the first inductor 16a and the second inductor 18a in different manners. In the heating operation controlled by the electric supply unit 20a, the first inductor 16a and the second inductor 18a create magnetic fields having the same direction. The electric supply unit 20a is configured to operate the first inductor 16a and the second inductor 18a in temporally different manners. The electric supply unit 20a is in the present case configured to operate the two inductors 16a, 18a in different manners in such a way that an energy input into the first subregion 22a of the tool holder 12a is balanced with an energy input into the second subregion 24a of the tool holder 12a. The energy inputs into the first subregion 22a and into the second subregion 24a are balanced in such a way that in the heating operation a radial expansion of the tool holder 12a is at least substantially the same in a region of the tool holder 12a that encompasses the entire receiving region 28a of the tool holder 12a.

The electric supply unit 20a is configured to operate the first inductor 16a and the second inductor 18a in phase. The electric supply unit 20a is configured to operate the first inductor 16a and the second inductor 18a with the same frequencies. The electric supply unit 20a is configured to operate the first inductor 16a and the second inductor 18a with the same pulse widths. The electric supply unit 20a is configured to operate at least one of the inductors 16a, 18a in a package-wise and/or pulsed manner. The electric supply unit 20a is configure to operate at least the second inductor 18a in a package-wise and/or pulsed manner. The electric supply unit 20a is configured for an, in particular sectionwise, controlling and/or regulation of a total energy quantity transferred to the tool holder 12a. The electric supply unit 20a is configured to operate the second inductor 18a depending on the first inductor 16a. The current value of the first inductor 16a constitutes a reference value for the operation of the second inductor 18a. The electric supply unit 20a is configured to operate the first inductor 16a and the second inductor 18a with an, in particular adjustable, frequency between 5 kHz and 70 kHz. The electric supply unit 20a comprises a control and/or regulation unit 70a, The control and/or regulation unit 70a may be realized as a separate control and/or regulation unit 70a of the induction heating device 52a or as a control and/or regulation unit 70a of the shrink-clamping and/or unshrink-unclamping station 54a. The control and/or regulation unit 70a comprises an output interface 90a, for example a display system on a graphic or numerical basis, and/or an input interface 92a, for example a keyboard or a touchscreen. The control and/or regulation unit 70a comprises a communication interface 94a, for example a LAN connection or an Internet connection. The electric supply unit 20a is connected to an energy source 96a, for example a public power grid. The electric supply unit 20a comprises an energy measuring unit 76a. The energy measuring unit 76a is configured to measure an electric energy quantity, The energy measuring unit 76a is configured to measure an effective power of the inductors 16a, 18a. The energy measuring unit 76a is connected between the energy source 96a and the inductors 16a, 18a. The energy measuring unit 76a is configured to measure the effective power extracted from the public power grid by the inductors 16a, 18a.

FIGS. 3a and 3b show schematic electric circuit diagrams of the electric supply unit 20a. The first inductor 16a and the second inductor 18a have different inductivities. The first inductor 16a, which is in a heating operation arranged closer to the tool receiving opening 36a of the tool holder 12a in the axial direction 34a of the induction heating unit 14a, has an inductivity that is by at least 3% smaller than an inductivity of the second inductor 18a, which is in the heating operation arranged farther away from the tool receiving opening 36a in the axial direction 34a of the induction heating unit 14a. The first inductor 16a and the second inductor 18a are connected electrically in parallel. The first inductor 16a and the second inductor 18a have a common electric point 32a. The electric supply unit comprises an H-bridge circuit 42a. The electric supply unit 20a comprises a modified H-bridge circuit 42a (see FIG. 3b). The modified H-bridge circuit 42a forms a three-way circuit. The modified H-bridge circuit 42a comprises two AC outputs 44a, 46a. The first AC output 44a is configured for supplying the first inductor 16a with an alternating current. The second AC output 46a is configured for supplying the second inductor 18a with an alternating current. At least a current feed via the second AC output 46a can be switched on and/or off independently from the current feed via the first AC output 44a. The current feeds via the two AC outputs 44a, 46a can be switched independently from each other.

FIG. 3c shows a schematic current-time diagram of the current feed of one of the two AC outputs 44a, 46a when one of the inductors 16a, 18a is switched off. The effective current value $I_{rms}$ of the AC output 44a, 46a is here plotted on an ordinate 98a. The time is here plotted on an abscissa 100a. The electric supply unit 20a is configured, in case of at least one of the two inductors 16a, 18a being switched off, to control the current feed to the inductor 16a, 18a such that an essential demagnetization of the tool 10a and/or the tool holder 12a is brought about. The electric supply unit 20a is configured, in case of at least one of the two inductors 16a, 18a being switched off, to control the current feed to the inductor 16a, 18a such that the effective current value $I_{rms}$ drops to zero over a sufficiently large time interval (several times 10 ms) instead of jumping to zero suddenly.

FIG. 4 shows a schematic flow chart of a method for operating the induction heating device 52a for a shrink-clamping and/or unshrink-unclamping of tools 10a into and/or out of tool holders 12a, wherein by means of the first inductor 16a and by means of the second inductor 18a respectively at least one different portion of the tool holder 12a is expanded by inductive heating in the shrink-clamping and/or unshrink-unclamping process. In at least one method step 102a the induction heating unit 14a is put over the tool holder 12a in such a way that the portion of the tool holder 12a that is arranged around the receiving region 28a is situated in an interior of the windings 26a of the inductors 16a, 18a. In at least one further method step 104a the heating operation is started. In the heating operation at least the portion of the tool holder 12a arranged around the receiving region 28a is heated by induction. Herein the material of the tool holder 12a expands around the receiving region 28a, as a result of which the receiving region 28a is thermally expanded. In the method step 104a, in the heating operation for expanding the tool holder 12a, the first inductor 16a and the second inductor 18a are operated in different manners. In the method step 104a, in the heating operation for expanding the tool holder 12a, one of the two inductors 16a, 18a is overall supplied with current longer than the other one of the inductors 16a, 18a. In a partial method step 106a of the method step 104a, the two inductors 16a, 18a are switched on. The two inductors 16a, 18a are switched on at least substantially at the same time. The switched-on inductors 16a, 18a are supplied with an, in particular mid-frequency, alternating current and respectively create alternating electromagnetic fields which interact with the material of the tool holder 12a and heat the material of the tool holder 12a. By the interaction of the alternating electromagnetic fields with the tool holder 12a energy is transferred from the inductors 16a, 18a to the tool holder 12a. In the partial method step 106a of the method step 104a the inductors 16a, 18a are switched on in a current-controlled fashion in order to avoid inrush current peaks. The current value is here increased continuously, for example over a time interval of 100 ms, until reaching the desired value.

In a further partial method step 108a of the method step 104a, one of the inductors 16a, 18a is switched off while the other one of the inductors 16a, 18a continues being switched on. In the partial method step 108a the one of the inductors 16a, 18a having the greater material thickness 30a, which is arranged in the subregion 22a, 24a, is switched off prior to the other one of the inductors 16a, 18a. In a tool holder 12a as shown in FIG. 2, the second inductor 18a, which is in this case in particular arranged below the first inductor 16a, is switched off prior to the first inductor 16a. The partial method step 108a comprises at least two alternative substeps 110a, 112a. In the first alternative substep 110a the second inductor 18a stays switched off until the end of the heating operation (see FIG. 5a). In the second alternative substep 112a the second inductor 18a is switched on and off in a package-wise manner while the first inductor 16a is switched on continuously (see FIG. 5b). By switching the second inductor 18a off earlier or by operating the second inductor 18a package-wise, there will be, among other effects, an advantageous reduction of a heat discharge in the tool holder 12a by downward heat conduction. By switching the second inductor 18a off earlier or by operating the second inductor 18a package-wise, among others, a heating of the tool holder 12a in the second subregion 24a will be reduced in comparison to the heating of the tool holder 12a in the first subregion 22a, to such an extent that the expansion or widening of the tool holder 12a will advantageously be at least substantially even over the entire receiving region 28a. In particular, due to the higher material thickness 30a of the tool holder 12a in the second subregion 24a, an absolute expansion would be greater with equal heating (equal temperature). By way of the controlling described, it is advantageously possible for a heating of the second subregion 24a to be balanced with the heating of the first subregion 22a in such a way that the respective expansions are at least substantially identical.

In at least one further partial method step 114a of the method step 104a the effective power of the inductors 16a, 18a is measured. Depending on the measurement value of the effective power, the second inductor 18a is in the partial method step 114a switched off and/or operated package-wise. In particular, a frequency or a duty cycle of the package-wise operation is controlled and/or regulated depending on the measurement value of the effective power. In the partial method step 108a, on the basis of the measurement values of the effective power measuring, the heating operation of the second inductor 18a is automatically terminated after reaching a predetermined percentage of a given total energy of all inductors 16a, 18a. In at least one further partial method step 116a of the method step 104a, the further one of the inductors 16a, 18a is switched off. In the further partial method step 116a the first inductor 16a is switched off. In the further partial method step 116a the heating operation is terminated. In the further partial method step 116a the heating operation is automatically terminated after reaching a predetermined total energy transferred from the inductors 16a, 18a to the tool holder 12a. In a further method step 118a the tool 10a is inserted into the tool holder 12a (shrink-clamping process) or the tool 10a is removed out of the tool holder 12a, if applicable with the assistance of the length adjustment pin 60a. In at least one further method step 120a the induction heating unit 14a is taken off the tool holder 12a. In at least one further, in particular optional, method step 122a the tool holder 12a is actively cooled.

FIG. 5a shows an activity-time diagram of the first inductor 16a (above) and the second inductor 18a (below). An activity status of the inductors 16a, 18a is plotted on the ordinate 98a. A value "0" means that the inductor 16a, 18a is switched off. A value "1" means that the inductor 16a, 18a is switched on. The time is plotted on the abscissa 100a. The second inductor 18a is switched off at the point in time "t1". The first inductor 16a is switched off at the point in time "t2". The second inductor 18a is switched off before the first inductor 16a. The control and/or regulation unit 70a controls and/or regulates the "On" times on the basis of measurement values of the energy measuring unit 76a or on the basis of a time that has passed. FIG. 5b shows an alternative activity-time diagram of the first inductor 16a (above) and the second inductor 18a (below). An activity status of the inductors 16a, 18a is plotted on the ordinate 98a. A value "0" means that the inductor 16a, 18a is switched off. A value "1" means that the inductor 16a, 18a is switched on. The time is plotted on the abscissa 100a. The second inductor 18a is operated in a package-wise manner. The second inductor 18a is switched on and off periodically. The control and/or regulation unit 70a controls and/or regulates the period and/or the duty cycle on the basis of measurement values of the energy measuring unit 76a or on the basis of pre-settings made by a user.

In FIGS. 6 to 12 seven further exemplary embodiments of the invention are shown. The following descriptions and the drawings are essentially limited to the differences between the exemplary embodiments, wherein regarding identically denominated components, in particular components having the same reference numerals, principally the drawings and/or the description of the other exemplary embodiments, in particular of FIGS. 1 to 5b, may be referred to. In order to distinguish between the exemplary embodiments, the letter a has been added to the reference numerals of FIGS. 1 to 5b. In the exemplary embodiments of FIGS. 6 to 12 the letter a has been replaced by the letters b to h.

FIG. 6 shows an alternative induction heating device 52b with an alternative induction heating unit 14b comprising alternative inductors 16b, 18b. The inductors 16b, 18b have a common winding body 78b. The inductors 16b, 18b are arranged in the induction heating unit 14b such that they are closely adjacent to each other. The first inductor 16b and the second inductor 18b are wound such that they partly overlap with each other. The first inductor 16b and the second inductor 18b are wound onto the common winding body 78b such that they partly overlap with each other. The first inductor 16b is wound section-wise conically, The second inductor 18b is wound section-wise conically.

FIG. 7 shows a second alternative induction heating device 52c with a second alternative induction heating unit 14c comprising two second alternative inductors 16c, 18c, The inductors 16c, 18c have separate winding bodies 124c, 126c. The inductors 16c, 18c are free of contact to each other. The inductors 16c, 18c are spaced apart from each other. A distance 128c of the inductors 16c, 18c from each other is less than a fifth of the axial extension of the shorter one of the inductors 16c, 18c. The distance 128c between the inductors 16c, 18c is smaller than 5 mm.

FIGS. 8a and 8b show schematic electric circuit diagrams of an electric supply unit 20d of a third alternative induction heating device 52d, which has a third alternative induction heating unit 14d comprising two third alternative inductors 16d, 18d. The first inductor 16d and the second inductor 18d are connected electrically in parallel. The first inductor 16d and the second inductor 18d are free of common electric points. The inductors 16d, 18d are electrically separate from each other. The electric supply unit 20d comprises an H-bridge circuit 42d, The electric supply unit 20d comprises a combined H-bridge circuit 42d with two parallel-connected, in particular synchronized, current sources, each of which has an H-bridge 42'd, 42"d (see FIG. 8b). The first H-bridge 42'd is configured for a supply of the first inductor 16d with an alternating current. The second H-bridge 42"d is configured for a supply of the second inductor 18d with an alternating current. The current feed via the two H-bridges 42'd, 42"d can be switched independently from each other. In particular, in the circuit according to FIGS. 8a and 8b it is possible that the pulse widths of the alternating currents of the two inductors 16d, 18d differ, wherein, however, in each case there is still an equality of phases and of frequencies of the alternating currents of the two inductors 16d, 18d.

FIGS. 9a and 9b show electric schematic circuit diagrams of an electric supply unit 20e of a fourth alternative induction heating device 52e with a fourth alternative induction heating unit 14e. The induction heating unit 14e comprises a first inductor 16e and a second inductor 18e. The induction unit 14e comprises a third inductor 48e. The third inductor 48e is operable by means of the electric supply unit 20e. The third inductor 48e can be additionally connected to the first inductor 16e electrically in parallel. The third inductor 48e is connected electrically in parallel to the second inductor 18e. The third inductor 48e has a greater inductivity than the first inductor 16e. The third inductor 48e has a greater inductivity than the second inductor 18e. The third inductor 48e has a common electric point 32e with the first inductor 16e. The third inductor 48e has a further common electric point 130e with the second inductor 18e. Alternatively the third inductor 48e could also, in analogy to FIGS. 8a and 8b, be supplied via a separate exit with a separate H-bridge, or could be connected as a connection inductivity between the two H-bridges 42'd, 42"d of FIGS. 8a and 8b. Herein it is in particular possible for the pulse widths of the alternating currents of the inductors 16e, 18e, 48e to differ, wherein, however, in each case there is still an equality of phases and of frequencies of the alternating currents of the inductors 16e, 18e, 48e. In case of differing pulse widths of the inductors 16e, 18e, 48e, the condition L2>L1 could be dispensed with.

FIGS. 10a and 10b show schematic electric circuit diagrams of an electric supply unit 20f of a fifth alternative induction heating device 52f comprising a fifth alternative induction heating unit 14f with three fifth alternative inductors 16f, 18f, 48f. The induction heating unit 14f is structured analogously to the induction heating unit 14e of FIGS. 9a and 9b, with the difference that the third inductor 48f can be additionally connected to the second inductor 18f. Furthermore, in contrast to the induction heating unit 14e of FIGS. 9a and 9b, the third inductor 48f is connected electrically in parallel to the first inductor 16f.

FIGS. 11a and 11b show schematic electric circuit diagrams of an electric supply unit 20g of a sixth alternative induction heating device 52g, comprising a sixth alternative induction heating unit 14g with two sixth alternative inductors 16g, 18g. The inductors 16g, 18g respectively have windings 26g. The two inductors 16g, 18g are connected electrically in series. The inductors 16g, 18g are configured to output respectively different energies to different subregions 22g, 24g of a tool holder 12g, which are in a heating operation respectively encompassed by the inductors 16g, 18g. For this purpose one of the inductors 16g, 18g has more windings 26g than the other inductor 16g, 18g. The inductor 16g, 18g of the two inductors 16g, 18g that is in a heating operation farther away from a tool receiving opening 36g of the tool holder 12g has the smaller number of windings 26g. The first inductor 16g has by at least 10% more windings 26g than the second inductor 18g. Advantageously it is possible to achieve and/or set a desired ratio of inductivities L1/L2 of the two inductors 16g, 18g by the differing numbers of windings 26g of the two inductors 16g, 18g. The two inductors 16g, 18g cannot be operated in different manners. The two inductors 16g, 18g cannot be operated in temporally different manners. The electric supply unit 20g comprises an H-bridge circuit 42g with a single H-bridge, which supplies both inductors 16g, 18g with an alternating current. The first inductor 16g and the second inductor 18g have differing inductivities. The first inductor 16g, which is in the heating operation arranged nearer to the tool receiving opening 36g of the tool holder 12g in an axial direction 34g of the induction heating unit 14g, has an inductivity that is greater at least by 3%, preferably at least by 10% and preferentially at least by 20% than the inductivity of the second inductor 18g, which is in the heating operation arranged farther away from the tool receiving opening 36g in the axial direction 34g of the induction heating unit 14g.

FIG. 12 shows a schematic electrical circuit diagram of an electric supply unit 20h of a seventh alternative induction heating device 52h comprising a seventh alternative induction heating unit 14h with two seventh alternative inductors 16h, 18h. The two inductors 16h, 18h are connected parallel to each other. The electric supply unit 20h comprises an H-bridge circuit 42h with a single H-bridge, which is configured to supply both parallel-connected inductors 16h, 18h with an alternating current. The electric supply unit 20h comprises a switch 132h, which is configured to interrupt the alternating current supply of the second inductor 18h, in particular while the first inductor 16h continues to be supplied with an alternating current by the electric supply unit 20h. The switch 132h may be realized as a relay, as a contactor or as a semiconductor. The switch 132h may be controllable by means of a control and/or regulation unit 70h of the electric supply unit 20h. In particular, in the solution of FIGS. 3a and 3b it is also conceivable that a comparable switch controls the alternating current supply of the second inductor 18a in a comparable manner.

Reference Numerals 10 tool
12 tool holder
14 induction heating unit
16 first inductor
18 second inductor
20 electric supply unit
22 subregion
24 subregion
26 winding
28 receiving region
30 material thickness
32 common electric point
34 axial direction
36 tool receiving opening
38 total winding height
40 standardized clamping-in length
42 H-bridge circuit
44 AC exit 46 AC exit
48 third inductor
50 kit
52 induction heating device
54 shrink-clamping and/or unshrink-unclamping station
56 base frame
58 holding device
60 length adjustment pin
62 tool shaft
64 rotation axis
66 tower
68 bearing rail
70 control and/or regulation unit
72 work region
74 coil axis
76 energy measuring unit
78 common winding body
80 housing unit
82 housing cover
84 housing shell
86 ferritic element
88 abutment
90 output interface
92 input interface
94 communication interface
96 energy source
98 ordinate
100 abscissa
102 method step
104 method step
106 partial method step
108 partial method step
110 substep
112 substep
114 partial method step
116 partial method step
118 method step
120 method step
122 method step
124 winding body
126 winding body
128 distance
130 common electric point
132 switch

The invention claimed is:

1. An induction heating device for a shrink-clamping and/or unshrink-unclamping of tools into and/or out of tool holders, with an induction heating unit comprising:
at least one first inductor; and
at least one second inductor,
wherein the first inductor and the second inductor are configured to respectively expand at least a portion of the tool holder by inductive heating in a shrink-clamping and/or unshrink-unclamping process, and
with an electric supply unit, wherein the inductors are configured to output respectively different energies to different subregions of a tool holder, which are in a heating operation respectively encompassed by the inductors, as one of the inductors has more windings than the other inductor and/or as the electric supply unit is at least configured to operate the first inductor and the second inductor in different manners, and
wherein a total winding height of the two inductors in an axial direction of the induction heating unit is smaller than a maximum standardized clamp-in length of the tool holders.

2. The induction heating device according to claim 1, wherein the electric supply unit is configured to operate the two inductors differently in such a way that an energy input into a first subregion of a tool holder, which is arranged around a receiving region of the tool holder and is in a heating operation encompassed by one of the inductors, is balanced with an energy input into a second subregion of the tool holder, which is also arranged around the receiving region of the tool holder and is in the heating operation encompassed by the other one of the inductors, as a result of which in the heating operation a radial expansion of the entire receiving region of the tool holder is identical in both subregions.

3. The induction heating device according to claim 1, wherein the electric supply unit (20a-h) is configured to operate the first inductor (16a-h) and the second inductor (18a-h) in phase.

4. The induction heating device according to claim 1, wherein in a heating operation the first inductor and the second inductor create magnetic fields having the same direction.

5. The induction heating device according to claim 1, wherein the first inductor and the second inductor are electrically connected in parallel.

6. The induction heating device according to claim 5, wherein the first inductor and the second inductor have a common electric point.

7. The induction heating device according to claim 1, wherein the first inductor and the second inductor have differing inductivities.

8. The induction heating device according to claim 7, wherein the first inductor, which is in the heating operation arranged nearer to a tool receiving opening of the tool holder in an axial direction of the induction heating unit, has an inductivity that is by at least 3% greater or smaller than an inductivity of the second inductor, which is in the heating operation arranged farther away from the tool receiving opening in the axial direction of the induction heating unit.

9. The induction heating device according to claim 1, wherein the electric supply unit is configured for operating at least one of the inductors in a package-wise or pulsed manner.

10. The induction heating device according to claim 1, wherein the electric supply unit is configured for controlling and/or regulation of a total energy quantity transferred to the tool holder.

11. The induction heating device at least according to claim 1, wherein the two inductors having different numbers of windings are electrically connected in series.

12. The induction heating device according to claim 11, wherein of the two inductors, the inductor that is in a heating operation farther away from a tool receiving opening of the tool holder has the smaller number of windings.

13. The induction heating device according to claim 1, wherein the electric supply unit is configured to operate the first inductor and the second inductor with a frequency between 5 kHz and 70 kHz.

14. The induction heating device according to claim 1, wherein the electric supply unit is configured, in case of at least one of the two inductors being switched off, to control a current feed to the inductor in such a way that an essential demagnetization of the tool and/or the tool holder is brought about.

15. The induction heating device according to claim 1, wherein the first inductor and the second inductor are arranged in the induction heating unit such that they are closely adjacent to each other.

16. The induction heating device according to claim 1, wherein the induction heating unit is free of field-shaping elements arranged between the first inductor and the second inductor.

17. The induction heating device according to claim 1, wherein the first inductor and the second inductor are wound such that they are free of overlap with each other.

18. The induction heating device according to claim 1, wherein the first inductor and the second inductor are wound such that they partially overlap.

19. The induction heating device according to claim 1, wherein at least the first inductor and/or the second inductor are/is wound conically and/or stepped.

20. The induction heating device according to claim 1, wherein the electric supply unit comprises a modified H-bridge circuit with at least two alternating current outputs.

21. The induction heating device according to claim 1, wherein the induction heating unit comprises at least one third inductor, which is operable via the electric supply unit.

22. The induction heating device according to claim 21, wherein the third inductor can be additionally connected in parallel to the first inductor and/or the second inductor.

23. The induction heating device according to claim 21, wherein the third inductor has a greater inductivity than the first inductor and/or than the second inductor.

24. The induction heating device according to one claim 1, wherein at least one of the inductors is removable out of the induction heating unit and/or exchangeable without destruction.

25. A kit with an induction heating unit of an induction heating device according to claim 1, and with a plurality of differently dimensioned inductors, which can be combined in the induction heating unit in different ways.

26. A method for operating an induction heating device for a shrink-clamping and/or unshrink-unclamping of tools into and/or out of tool holders according to claim 1, with an induction heating unit comprising at least one first inductor and at least one second inductor which is realized separately from the first inductor,
wherein by means of the first inductor and by means of the second inductor respectively at least one portion of the tool holder is/are expanded by inductive heating in a shrink-clamping and/or unshrink-unclamping process,
wherein in a heating operation for expanding a tool holder the first inductor and the second inductor are operated in different manners, and
wherein in the heating operation for an expansion of the tool holder one of the two inductors is overall supplied with a current longer than the other inductor.

27. The method according to claim 26, wherein the heating operation of at least one of the inductors is automatically terminated after reaching a predetermined energy transferred from the inductor to the tool holder or after reaching a predetermined percentage of a given total energy of all inductors.

28. The induction heating device according to claim 1, wherein the second inductor is realized separately from the first inductor.

29. The induction heating device according to claim 1, wherein the first inductor and the second inductor are configured to respectively expand different portions of the tool holder by inductive heating in the shrink-clamping and/or unshrink-unclamping process.

30. The induction heating device according to claim 10, wherein the electric supply unit is configured for section-wise controlling and/or regulation of the total energy quantity transferred to the tool holder.

* * * * *